(12) United States Patent  
Ikeda et al.

(10) Patent No.: US 9,730,030 B2  
(45) Date of Patent: Aug. 8, 2017

(54) APPARATUS AND SYSTEM FOR PROCESSING EMERGENCY EVENT INFORMATION AND PROVIDING EVACUATION GUIDANCE

(71) Applicants: Hajimu Ikeda, Kanagawa (JP); Yasuyuki Nakamura, Tochigi (JP)

(72) Inventors: Hajimu Ikeda, Kanagawa (JP); Yasuyuki Nakamura, Tochigi (JP)

(73) Assignee: Ricoh Company, Ltd., Tokyo (JP)

( * ) Notice: Subject to any disclaimer, the term of this patent is extended or adjusted under 35 U.S.C. 154(b) by 0 days.

(21) Appl. No.: 14/964,720

(22) Filed: Dec. 10, 2015

(65) Prior Publication Data

US 2016/0205514 A1 Jul. 14, 2016

(30) Foreign Application Priority Data

Jan. 13, 2015 (JP) .................. 2015-004245

(51) Int. Cl.
*H04W 4/04* (2009.01)
(52) U.S. Cl.
CPC .................. *H04W 4/043* (2013.01)
(58) Field of Classification Search
CPC ..... H04W 4/22; H04W 76/007; H04W 64/00; H04W 4/043
USPC .......................... 455/404.1, 404.2
See application file for complete search history.

(56) References Cited

U.S. PATENT DOCUMENTS

| 2010/0164732 | A1* | 7/2010 | Wedig | G08B 7/066 340/577 |
| 2013/0237179 | A1* | 9/2013 | Potineni | G01C 21/206 455/404.2 |
| 2014/0097939 | A1* | 4/2014 | Pham | H04W 4/22 340/8.1 |
| 2014/0206307 | A1* | 7/2014 | Maurer | H04W 4/22 455/404.2 |
| 2014/0253326 | A1* | 9/2014 | Cho | H04W 4/22 340/539.13 |
| 2015/0003661 | A1 | 1/2015 | Shinotsuka | |
| 2015/0296358 | A1* | 10/2015 | Akutsu | H04W 4/02 455/404.2 |
| 2016/0088087 | A1* | 3/2016 | Lo | H04L 41/12 709/224 |

FOREIGN PATENT DOCUMENTS

| JP | H06-111172 | 4/1994 |
| JP | 2009-198209 | 9/2009 |
| JP | 2015-029245 | 2/2015 |

* cited by examiner

*Primary Examiner* — Christopher M Brandt
(74) *Attorney, Agent, or Firm* — IPUSA, PLLC

(57) ABSTRACT

An information processing apparatus includes a receiving unit configured to receive from the terminal apparatus, terminal apparatus identification information of the terminal apparatus and output apparatus identification information of an output apparatus that has been acquired by the terminal apparatus; and a notifying unit configured to notify the terminal apparatus of relocation information based on the terminal apparatus identification information and the output apparatus identification information received by the receiving unit. The relocation information includes at least one of information on moving from the position of the terminal apparatus to a predetermined destination and information on moving from the position of the terminal apparatus to a next location.

11 Claims, 32 Drawing Sheets

| TERMINAL ID _602_ | REGISTRATION DATE/TIME _603_ |
|---|---|
| XXX-XXXX-0001 | 2013/11/3 10:00 |
| XXX-XXXX-0002 | 2013/12/9 15:05 |
| XXX-XXXX-0003 | 2014/1/6 11:24 |
| XXX-XXXX-0004 | 2014/1/23 11:00 |
| XXX-XXXX-0005 | 2014/1/24 12:00 |
| XXX-XXXX-0006 | 2014/1/25 13:00 |
| XXX-XXXX-0007 | 2014/1/26 13:00 |
| XXX-XXXX-0008 | 2014/1/27 13:00 |
| XXX-XXXX-0009 | 2014/1/28 10:00 |
| XXX-XXXX-0010 | 2014/1/29 15:00 |
| XXX-XXXX-0011 | 2014/1/30 17:00 |
| XXX-XXXX-0012 | 2014/1/31 16:00 |
| XXX-XXXX-0013 | 2014/2/1 11:00 |
| XXX-XXXX-0014 | 2014/2/2 9:00 |
| XXX-XXXX-0015 | 2014/2/3 15:00 |

| LOCATION _605_ | SPEAKER ID _606_ |
|---|---|
| POINT 1 | SP00001 |
| POINT 2 | SP00002 |
| POINT 3 | SP00003 |
| POINT 4 | SP00004 |
| POINT 5 | SP00005 |
| POINT 6 | SP00006 |
| POINT 7 | SP00007 |
| POINT 8 | SP00008 |
| POINT 9 | SP00009 |
| POINT 10 | SP00010 |
| POINT 11 | SP00011 |
| POINT 12 | SP00012 |
| POINT 13 | SP00013 |
| POINT 14 | SP00014 |
| POINT 15 | SP00015 |

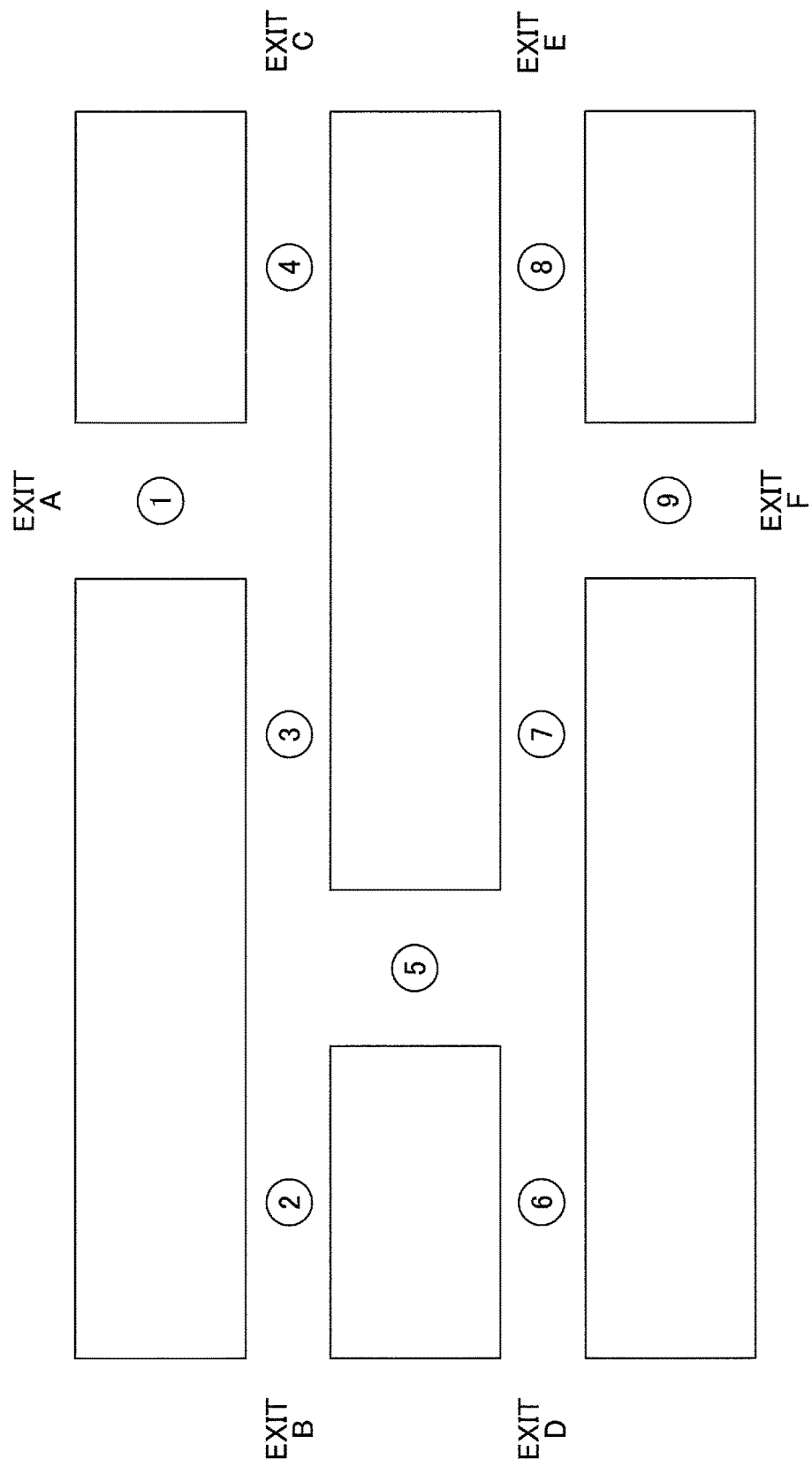

| SPEAKER ID 702 | TERMINAL ID 703 | LOCATION 704 | ACQUISITION DATE/TIME 705 |
|---|---|---|---|
| SP00005 | XXX-XXXX-0005 | POINT 5 | 2014/4/3 10:00 |
| SP00001 | XXX-XXXX-0001 | POINT 1 | 2014/4/3 10:00 |
| SP00002 | XXX-XXXX-0002 | POINT 2 | 2014/4/3 10:00 |
| SP00003 | XXX-XXXX-0003 | POINT 3 | 2014/4/3 10:00 |
| SP00002 | XXX-XXXX-0004 | POINT 2 | 2014/4/3 10:00 |
| SP00006 | XXX-XXXX-0006 | POINT 6 | 2014/4/3 10:00 |
| SP00002 | XXX-XXXX-0007 | POINT 2 | 2014/4/3 10:00 |
| SP00003 | XXX-XXXX-0008 | POINT 3 | 2014/4/3 10:00 |
| SP00002 | XXX-XXXX-0009 | POINT 2 | 2014/4/3 10:00 |
| SP00002 | XXX-XXXX-0010 | POINT 2 | 2014/4/3 10:00 |
| SP00002 | XXX-XXXX-0011 | POINT 2 | 2014/4/3 10:00 |
| SP00003 | XXX-XXXX-0012 | POINT 3 | 2014/4/3 10:00 |
| SP00007 | XXX-XXXX-0013 | POINT 7 | 2014/4/3 10:00 |
| SP00008 | XXX-XXXX-0014 | POINT 8 | 2014/4/3 10:00 |

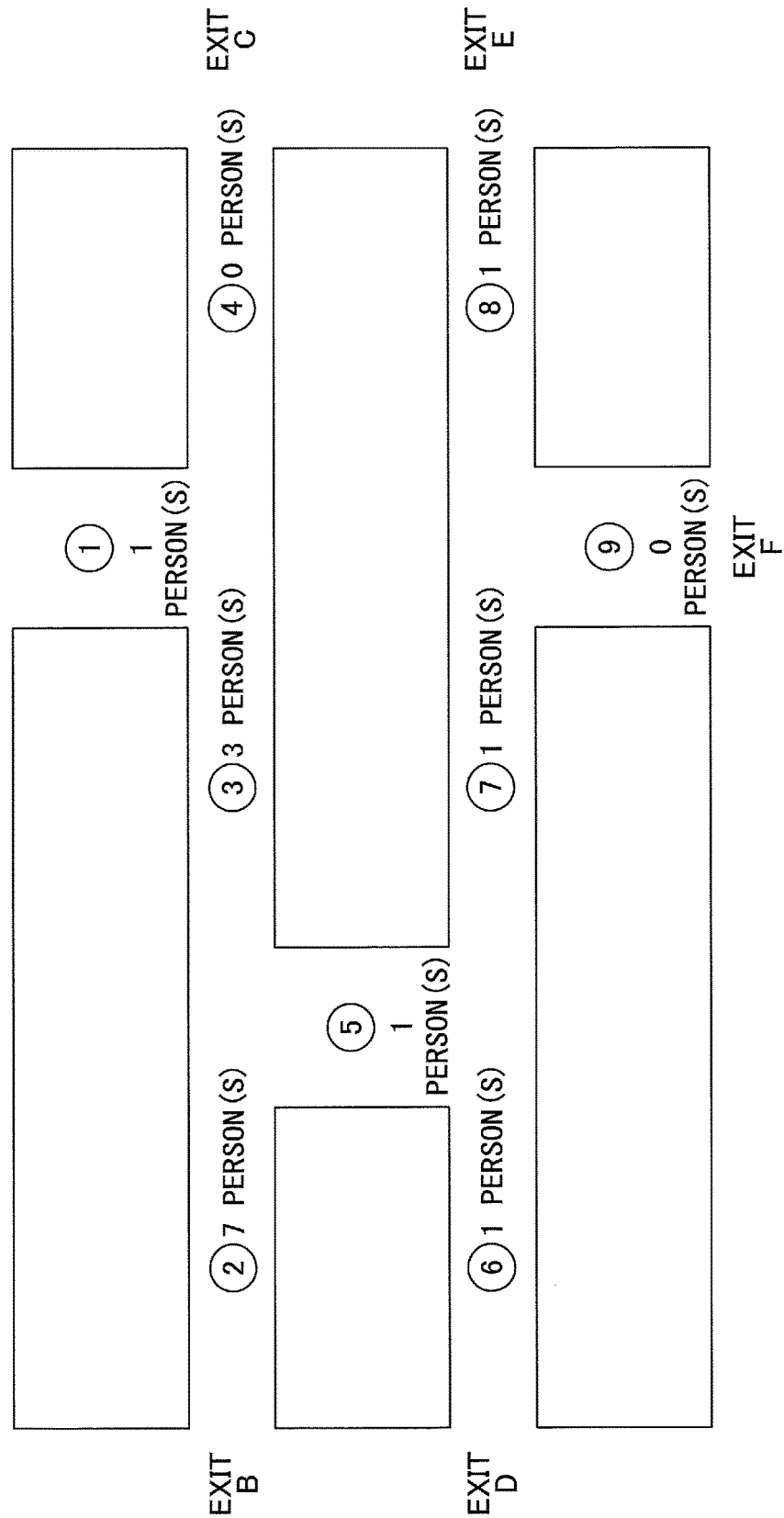

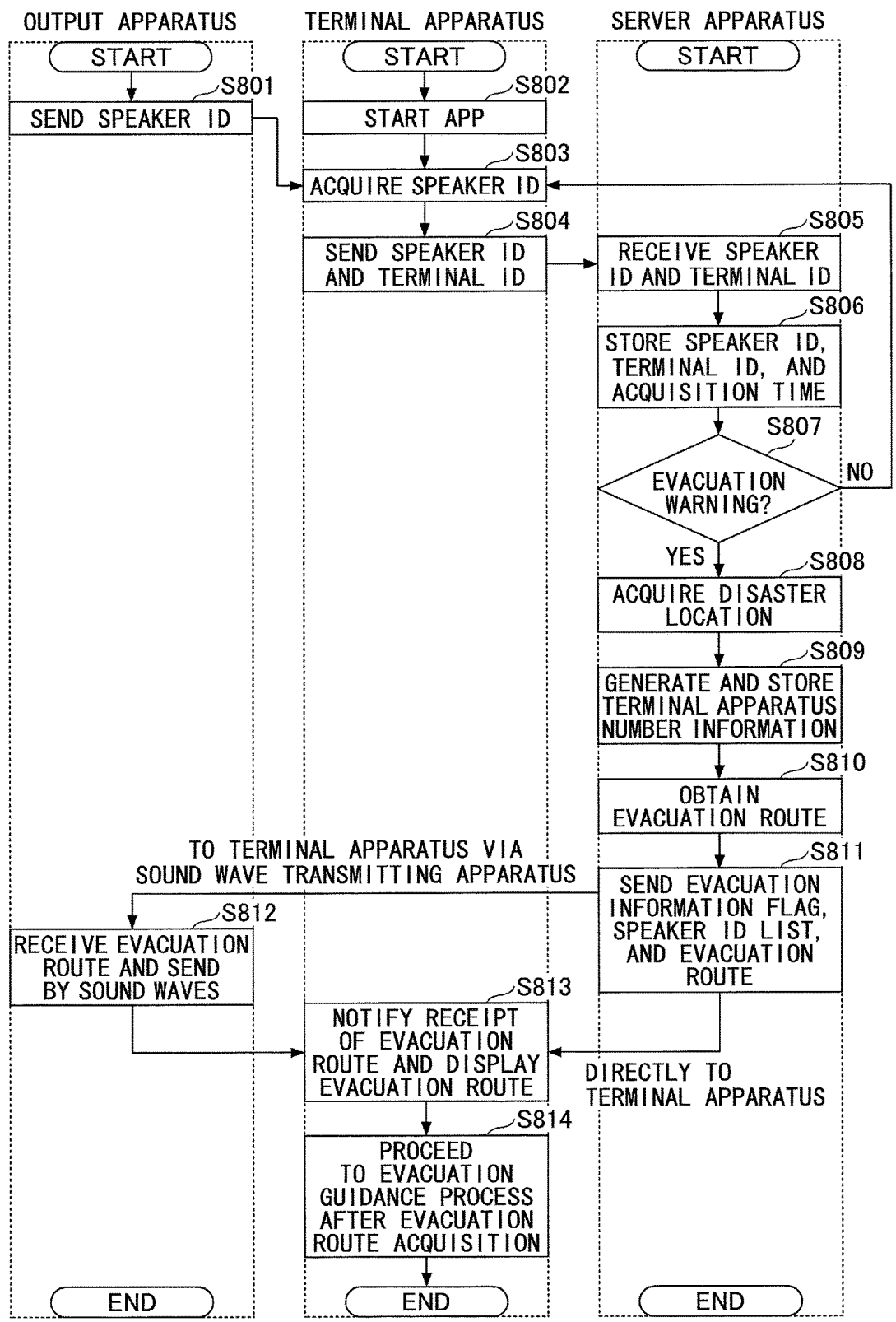

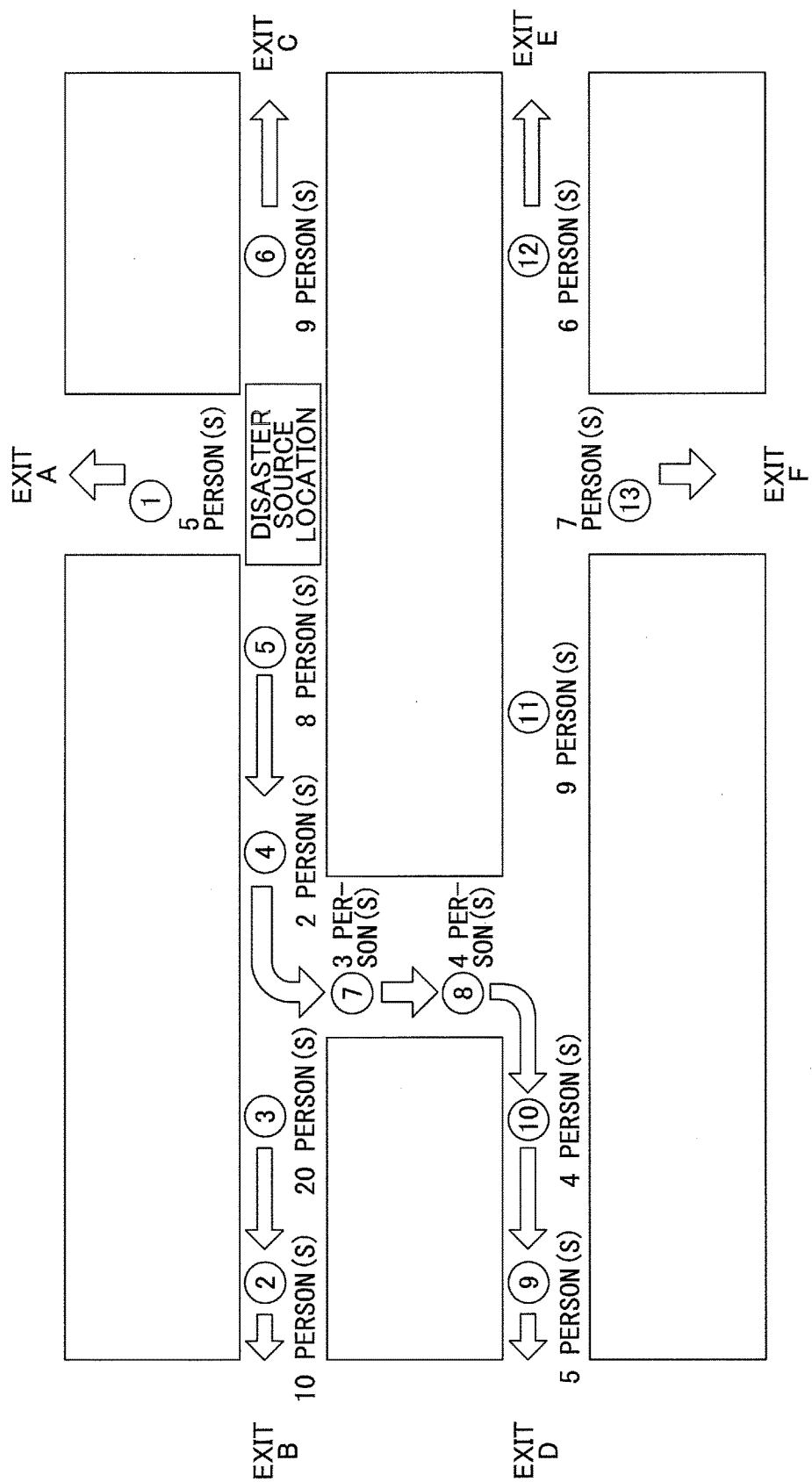

FIG.22B

| SPEAKER ID | TERMINAL ID | LOCATION | ACQUISITION DATE/TIME | GUIDANCE POINT |
|---|---|---|---|---|
| SP00004 | XXX-XXXX-0105 | POINT 4 | 2014/4/3 10:00 | POINT 7 |
| SP00004 | XXX-XXXX-0101 | POINT 4 | 2014/4/3 10:00 | POINT 7 |
| SP00005 | XXX-XXXX-0161 | POINT 5 | 2014/4/3 10:00 | POINT 4 |
| SP00005 | XXX-XXXX-0162 | POINT 5 | 2014/4/3 10:00 | POINT 4 |
| SP00005 | XXX-XXXX-0163 | POINT 5 | 2014/4/3 10:00 | POINT 4 |
| SP00005 | XXX-XXXX-0164 | POINT 5 | 2014/4/3 10:00 | POINT 4 |
| SP00005 | XXX-XXXX-0165 | POINT 5 | 2014/4/3 10:00 | POINT 4 |
| SP00005 | XXX-XXXX-0166 | POINT 5 | 2014/4/3 10:00 | POINT 4 |
| SP00005 | XXX-XXXX-0167 | POINT 5 | 2014/4/3 10:00 | POINT 4 |
| SP00005 | XXX-XXXX-0168 | POINT 5 | 2014/4/3 10:00 | POINT 4 |

FIG.23B

| SPEAKER ID | TERMINAL ID | LOCATION | ACQUISITION DATE/TIME |
|---|---|---|---|
| SP00004 | XXX-XXXX-0105 | PONT 5 | 2014/4/3 10:01 |
| SP00005 | XXX-XXXX-0101 | PONT 4 | 2014/4/3 10:01 |
| SP00005 | XXX-XXXX-0162 | PONT 5 | 2014/4/3 10:01 |
| SP00005 | XXX-XXXX-0163 | PONT 5 | 2014/4/3 10:01 |
| SP00005 | XXX-XXXX-0164 | PONT 5 | 2014/4/3 10:01 |
| SP00005 | XXX-XXXX-0165 | PONT 5 | 2014/4/3 10:01 |
| SP00005 | XXX-XXXX-0166 | PONT 4 | 2014/4/3 10:01 |
| SP00005 | XXX-XXXX-0167 | PONT 4 | 2014/4/3 10:01 |

FIG.24

| TERMINAL ID | LOCATION DETECTED BY SYSTEM (10:01) | GUIDANCE LOCATION | DIFFERENT POINT | AWAY FROM DISASTER LOCATION | DETERMINATION |
|---|---|---|---|---|---|
| XXX-XXXX-0105 | POINT 5 | POINT 7 | × | × | × |
| XXX-XXXX-0101 | POINT 4 | POINT 7 | × | ○ | ○ |
| XXX-XXXX-0162 | POINT 5 | POINT 4 | × | ○ | ○ |
| XXX-XXXX-0163 | POINT 5 | POINT 4 | × | ○ | ○ |
| XXX-XXXX-0164 | POINT 5 | POINT 4 | × | ○ | ○ |
| XXX-XXXX-0165 | POINT 5 | POINT 4 | × | ○ | ○ |
| XXX-XXXX-0166 | POINT 4 | POINT 4 | ○ | | ○ |
| XXX-XXXX-0167 | POINT 4 | POINT 4 | ○ | | ○ | ized
APPARATUS AND SYSTEM FOR PROCESSING EMERGENCY EVENT INFORMATION AND PROVIDING EVACUATION GUIDANCE

BACKGROUND OF THE INVENTION

1. Field of the Invention

The present invention relates to an information processing apparatus and an information processing system.

2. Description of the Related Art

When a disaster such as a fire occurs indoors such as inside an office building or a shopping mall, for example, persons within the premise may be notified of information for evacuating the premise through in-house public announcements and the like. However, notification through announcements may not be such an effective strategy for efficiently guiding and evacuating persons because the same information will be conveyed to a large number of persons within the premise and cause concentration of evacuating persons at a specific emergency exit, for example.

SUMMARY OF THE INVENTION

According to one embodiment of the present invention, an information processing apparatus is provided that includes a receiving unit configured to receive from the terminal apparatus, terminal apparatus identification information of the terminal apparatus and output apparatus identification information of an output apparatus that has been acquired by the terminal apparatus; and a notifying unit configured to notify the terminal apparatus of relocation information based on the terminal apparatus identification information and the output apparatus identification information received by the receiving unit. The relocation information includes at least one of information on moving from the position of the terminal apparatus to a predetermined destination and information on moving from the position of the terminal apparatus to a next location.

BRIEF DESCRIPTION OF THE DRAWINGS

FIGS. 6A-6C illustrate examples of information included in a registered information database according to the first embodiment;

FIGS. 7A and 7B illustrate examples of information included in a position information database according to the first embodiment;

FIG. 8 is a flowchart illustrating an exemplary evacuation route notification process according to the first embodiment;

FIGS. 22A and 22B illustrate an example of terminal apparatus position information with respect to a disaster source location according to the fourth embodiment;

FIGS. 23A and 23B illustrate an example of terminal apparatus position information with respect to a disaster source location after a certain time period according to the fourth embodiment;

FIG. 24 illustrates an example of determination information according to the fourth embodiment;

DESCRIPTION OF THE PREFERRED EMBODIMENTS

An aspect of the present invention is directed to providing an information processing system that is capable of presenting an appropriate evacuation route to each user according to the position of the user when a disaster occurs within a premise.

In the following, embodiments of the present invention are described with reference to the accompanying drawings.

<System Configuration>

In the following, an exemplary configuration of an information processing system 100 according to a first embodiment of the present invention is described.

Figure 1:
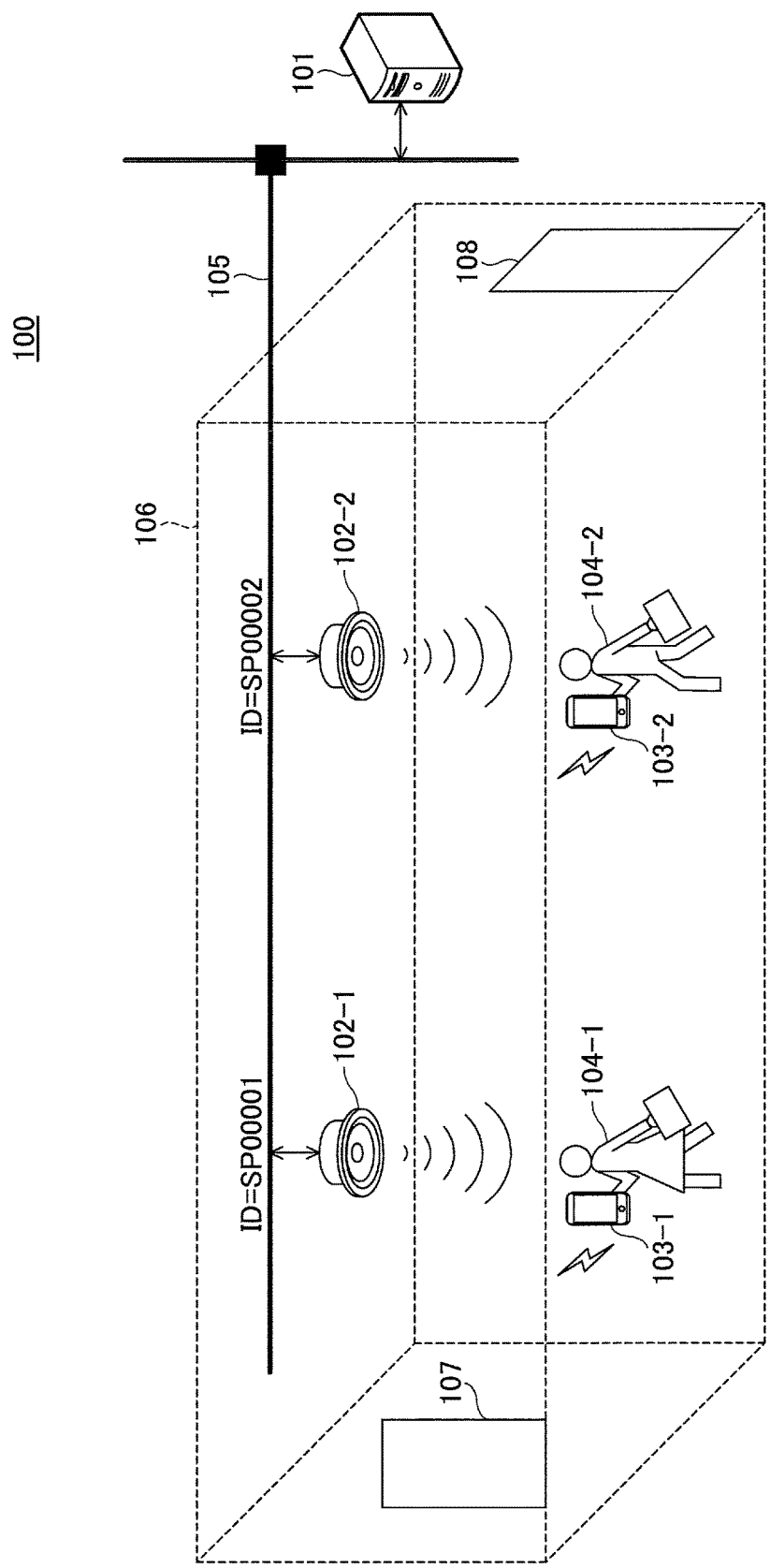
FIG. 1 illustrates an exemplary configuration of an information processing system according to a first embodiment of the present invention.

FIG. 1 illustrates an exemplary configuration of the information processing system 100 according to the first embodiment. In FIG. 1, the information processing system 100 includes a server apparatus 101, a plurality of output apparatuses 102-1 and 102-2 that output sound waves, and a plurality of terminal apparatuses 103-1 and 103-2 that are connected to a network 105 such as the Internet or a LAN (Local Area Network).

Note that in the descriptions below, an arbitrary output apparatus among the plurality of output apparatuses 102-1 and 102-2 may simply be referred to as "output apparatus 102". Similarly, an arbitrary terminal apparatus among the plurality of terminal apparatuses 103-1 and 103-2 may simply be referred to as "terminal apparatus 103".

The plurality of output apparatuses 102-1 and 102-2 may be installed at different positions of the ceiling of a building 106, which may be a shopping mall or an office building, for example. The output apparatus 102 outputs a sound wave including a unique speaker ID (as an example of output apparatus identification information). The output apparatus 102 may include an electro-acoustic conversion element such as a speaker. Alternatively, the output apparatus 102 may be configured to output a sound wave using a speaker apparatus or the like used for making in-house public announcements, for example.

The output apparatus 102 preferably has a function for communicating with the server apparatus 101 via the network 105 and outputs a sound wave including a speaker ID specified by the server apparatus 101. Alternatively, the output apparatus 102 may have a speaker ID corresponding to unique identification information for the output apparatus 102 stored in advance and output a sound wave including the speaker ID that is stored in advance. In the example of FIG. 1, the output apparatus 102-1 outputs a sound wave including a speaker ID "SP00001", and the output apparatus 102-2 outputs a sound wave including a speaker ID "SP00002". Note that the number of output apparatuses provided in the information processing system 100 is not limited to the plurality of output apparatuses 102-1 and 102-2 as in the illustrated example. For example, in one preferred embodiment, the output apparatuses 102 may be arranged at predetermined intervals (e.g., 10 m) in a manner similar to speakers that are arranged for making in-house public announcements, and in this way, users may be able to acquire a sound (sound wave) at any location within the building 106.

The plurality of terminal apparatuses 103-1 and 103-2 may be information processing apparatuses such as smart phones, mobile phones, and/or tablet terminals that are carried by users inside the building 106. The terminal apparatus 106 may be connected to the network 105 by wireless communication or the like to establish communication with the server apparatus 101, for example. Also, the terminal apparatus 103 may acquire a sound wave output by the output apparatus 102 using a built-in microphone or the like and extract information such as a speaker ID of the output apparatus 102 included in the acquired sound wave, for example.

The server apparatus 101 may be an information processing apparatus such as a PC (Personal Computer) that is capable of communicating with the terminal apparatus 103, for example. The server apparatus 101 executes a program for implementing the information processing system 100 according to the present embodiment. The server apparatus 101 includes a storage unit for storing information such as floor information (map information) of the building 106, information indicating the position (location) of the output apparatuses 102, and a registered information database storing registered information in association with a speaker ID (hereinafter referred to as "registered information DB"), for example. The server apparatus 101 preferably has a function of setting a speaker ID to be sent by the output apparatus 102 by transmitting the corresponding speaker ID to the output apparatus 102 via the network 105.

In the information processing system 100 having the above configuration, for example, a user 104-1 may start an application program for implementing the information processing system 100 that is installed in the terminal apparatus 103-1 (hereinafter referred to as "app"). In this way, the terminal apparatus 103-1 may acquire a sound wave output from the output apparatus 102-1 with its microphone and extract the speaker ID "SP00001" included in the acquired sound wave. Also, the terminal apparatus 103-1 sends a terminal ID of the terminal apparatus 103-1 (as an example of terminal apparatus identification information) and the speaker ID "SP00001" acquired from the output apparatus 102-1 to the server apparatus 101. Similarly, the terminal apparatus 103-2 of a user 104-2 sends a terminal ID of the terminal apparatus 103-2 and the speaker ID "SP00002" acquired from the output apparatus 102-2 to the server apparatus 101.

Meanwhile, when the server apparatus 101, receives the identification information of the terminal apparatus 103 and the speaker ID acquired by the terminal apparatus 103 from the output unit 102, the server apparatus 101 may be able to identify the position of the terminal apparatus 103 based on the registered information DB as described above.

Also, when a disaster such as a fire occurs inside the building 106, the server apparatus 101 may provide notification of relocation information such as an evacuation route to a predetermined destination (e.g., evacuation area, emergency exit) or an evacuation route to a next location (point) for each terminal apparatus 103 based on the information received from each terminal apparatus 103, for example. In such case, because the server apparatus 101 has information on the positions of the plurality of terminal apparatuses 103 within the building 106, the server apparatus 101 may notify an appropriate evacuation route to each terminal apparatus 103 based on the position of each terminal apparatus 103.

For example, in a case where the building 106 has multiple entrances/exits 107 and 108, when notification of evacuation information is made at once through in-house public announcements in a conventional manner, evacuating persons may be concentrated at a certain entrance/exit such as the entrance/exit 107, for example, and smooth evacuation may be hindered as s result.

On the other hand, in the information processing system 100 according to the present embodiment, for example, in FIG. 1, notification of an evacuation route to the entrance/exit 107 may be made to the terminal apparatus 103-1 of the user 104-1, whereas notification of an evacuation route to the entrance/exit 108 may be made to the terminal apparatus 103-2 of the user 104-2.

Thus, in the information processing system 100 according to the present embodiment, when a disaster such as a fire occurs inside the building 106, notification of an appropriate evacuation route may be easily conveyed to each user in the building 106 according to the position of the user.

<Hardware Configuration>

(Hardware Configuration of Server Apparatus)

Figure 2:
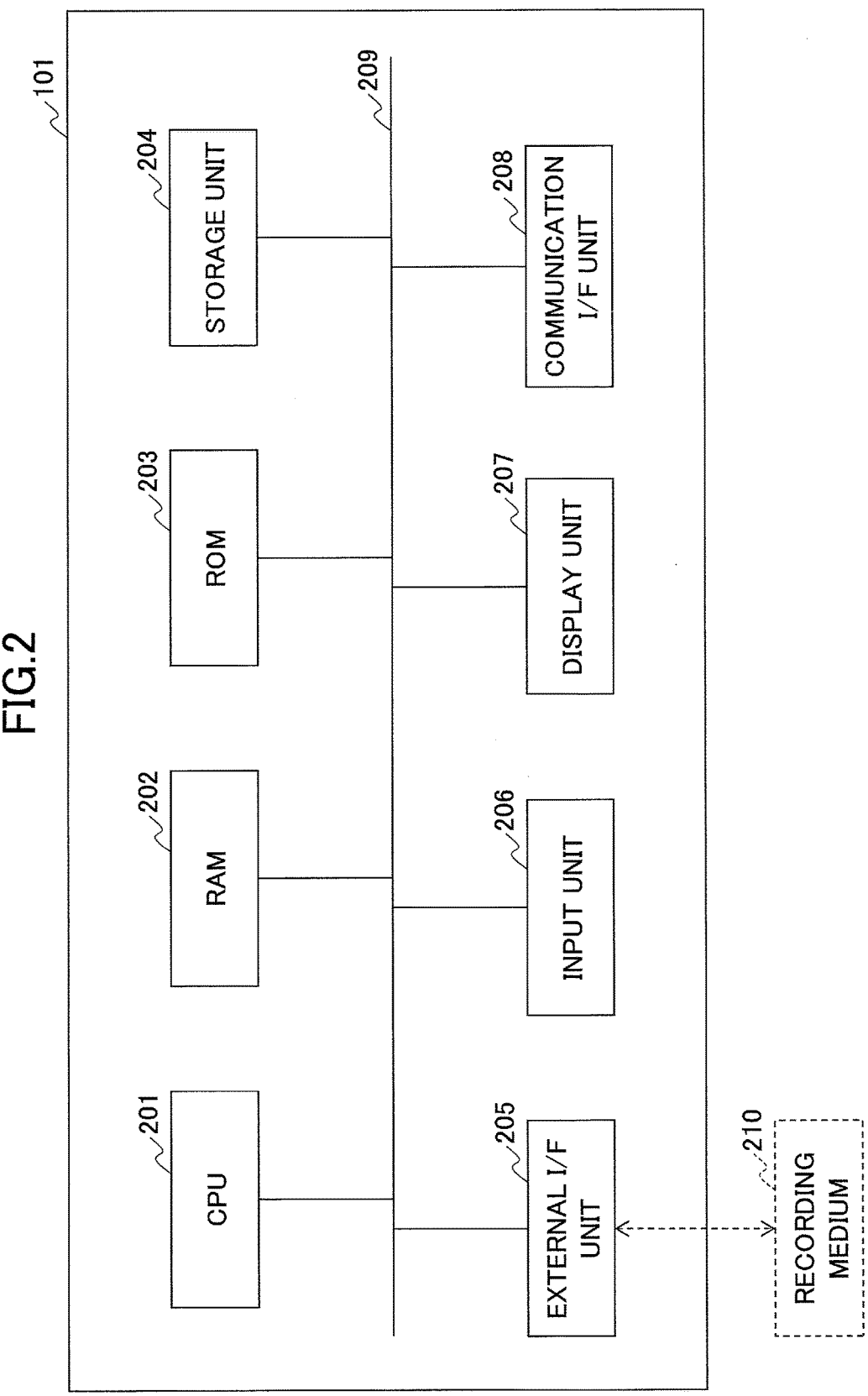
FIG. 2 illustrates an exemplary hardware configuration of a server apparatus according to the first embodiment.

FIG. 2 is a block diagram illustrating an exemplary hardware configuration of the server apparatus 101 according to the present embodiment. In FIG. 2, the server apparatus 101 has a configuration of a general-purpose computer including a CPU (Central Processing Unit) 201, a RAM (Random Access Memory) 202, a ROM (Read Only Memory) 203, a storage unit 204, an external I/F (Interface) unit 205, an input unit 206, a display unit 207, a communication I/F unit 208, and a bus 209.

The CPU 201 includes an arithmetic and logic unit that reads a program and/or data from a storage device such as the ROM 203 and/or the storage unit 204, loads the program and/or data in the RAM 202, and executes processes according to the program and/or data to control the overall operations and functions of the server apparatus 101. The RAM 202 is a volatile memory (storage device) that is used as a working area of the CPU 201. The ROM 203 is a nonvolatile memory (storage device) that can store programs and/or data even when the power is turned off.

The storage unit 204 is a large capacity storage device such as an HDD (Hard Disk Drive) or an SSD (Solid State Drive) that stores an OS (Operating System), application programs, and various data, for example.

The external I/F unit 205 is an interface between the server apparatus 101 and an external device. The external device may be a recording medium 210, for example. The server apparatus 101 may read information from and/or write information on the recording medium 201 via the external I/F 205. Specific examples of the recording medium 210 include an optical disk, a magnetic disk, a memory card, a universal serial bus (USB) memory, and the like. Also, the server apparatus 101 may store a predetermined program in the recording medium 210 and install the predetermined program in the server apparatus 101 via the external I/F unit 205 to execute the predetermined program.

The input unit 206 may include a keyboard and/or a mouse, for example, and is used to input various operation signals to the server apparatus 101. The display unit 207 may include a display, for example, and is configured to display processing results of the server apparatus 101.

The communication I/F unit 208 is a communication interface such as a wired/wireless LAN that connects the server apparatus 101 to the network 105. In this way, the server apparatus 101 may establish data communication with other computers via the communication I/F unit 208.

Note that the hardware configuration illustrated in FIG. 2 is merely one example. In other examples, the server apparatus 101 may have the input unit 206 and/or the display unit 207 externally connected thereto, for example.

(Hardware Configuration of Output Apparatus)

Figure 3:
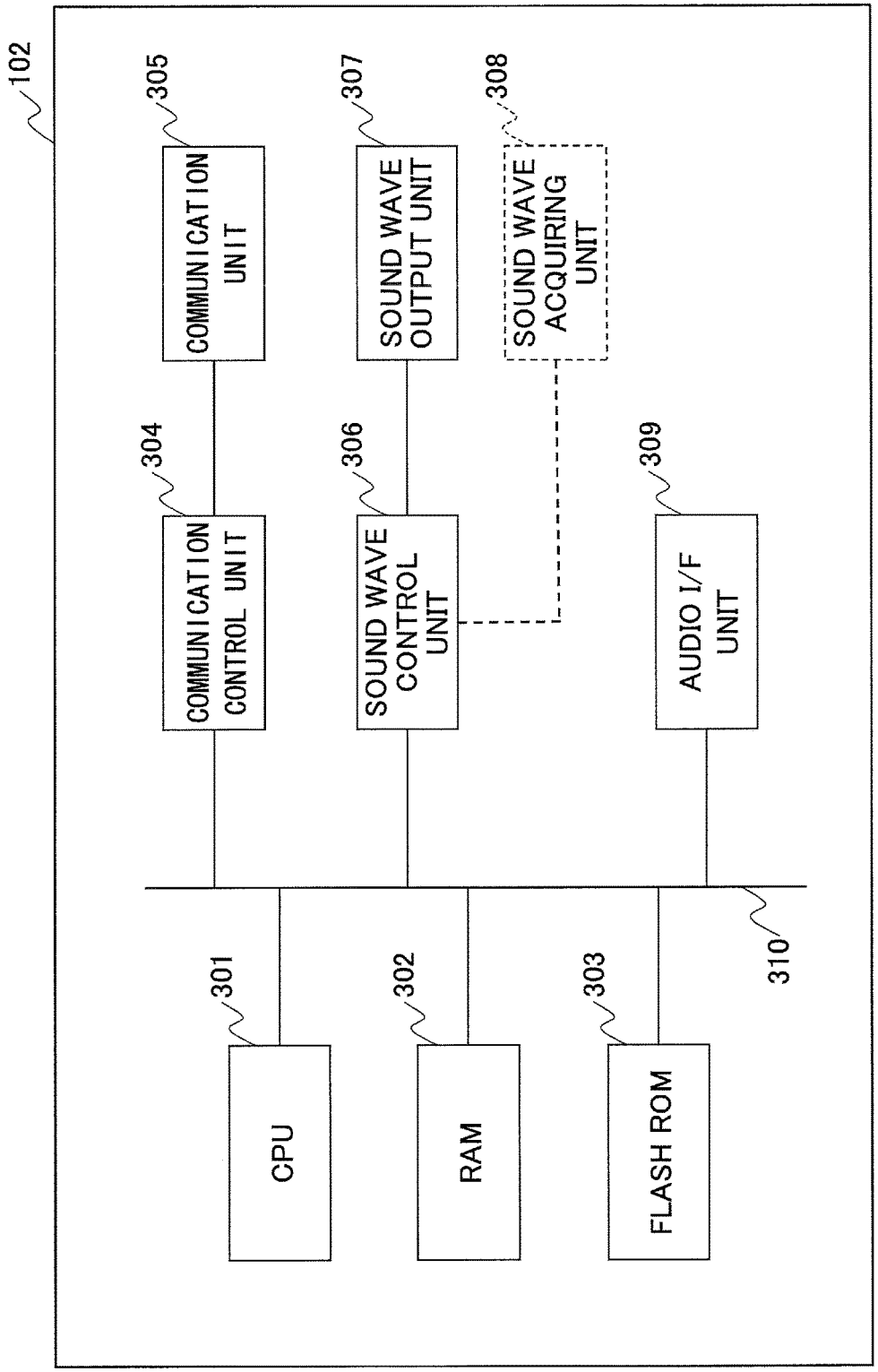
FIG. 3 illustrates an exemplary hardware configuration of an output apparatus according to the first embodiment.

FIG. 3 is a diagram illustrating an exemplary hardware configuration of the output apparatus 102 according to the present embodiment. In FIG. 3, the output apparatus 102 includes a CPU 301, a RAM 302, a flash ROM 303, a communication control unit 304, a communication unit 305, a sound wave control unit 306, a sound wave output unit 307, and an audio I/F unit 309. Also, the output apparatus 102 preferably includes a sound wave acquiring unit 308.

The CPU 301 is an arithmetic unit that implements functions of the output apparatus 102 by executing a relevant program stored in the flash ROM 303, for example. The RAM 302 is a volatile memory used as a working area for the CPU 301. The flash ROM 303 is a nonvolatile memory for storing programs of the output apparatus 102 and information such as a speaker ID.

The communication unit 305 is a communication interface such as a wired/wireless LAN that establishes connection between the output apparatus 102 and the network by a predetermined communication method. The communication control unit 304 controls communication between the output apparatus 102 and the server apparatus 101 and the like by controlling the communication unit 305. The communication control unit 304 may be implemented by a program executed by the CPU 301, for example.

The sound wave control unit 306 converts the speaker ID of the output apparatus 102 stored in the flash ROM 303 or the like into a sound wave signal and outputs the sound wave signal to the sound wave output unit 307. Preferably, the sound wave control unit 306 converts the speaker ID into a sound wave signal having a high frequency of at least 16 kHz of the audio frequency band. Note that the directivity of a sound wave increases as the frequency of the sound wave increases, and at a frequency of 16 kHz or higher, the sound wave would be hardly audible to the human ear. Thus, a sound wave at such a high frequency may be suitable for transmitting the speaker ID within a predetermined range. Preferably, the sound wave control unit 306 is capable of superimposing the speaker ID on an audio signal such as music or an in-house public announcement input from the audio I/F unit 309 and outputting the superimposed audio signal with the speaker ID to the sound wave output unit 307.

Note that in the present embodiment, the method used to convert the speaker ID into a sound wave signal is not particularly limited. In one example, a digital value of "1" or "0" may be represented by turning on/off a signal with a predetermined frequency (e.g., 19 kHz). In this case, the terminal apparatus 103 that has received the sound wave may acquire the information included in the sound wave by sampling the sound wave at a predetermined sampling rate to determine whether the predetermined frequency is included in the sound wave.

Also, if the output apparatus 102 includes the sound wave acquiring unit 308, the sound wave control unit 306 also performs a process for converting audio acquired by the sound wave acquiring unit 308 into an audio signal.

The sound wave output unit 307 is an audio output apparatus such as a speaker that converts a sound wave signal input from the sound wave control unit 306 into a sound wave and outputs the sound wave. The sound wave acquiring unit 308 is an audio pickup device such as a microphone that picks up sound from the surrounding. The audio I/F 309 is an audio interface for inputting audio signals such as announcements, music, and in-house broadcasts, for example.

Note that the hardware configuration of the output apparatus 102 shown in FIG. 2 is merely one example. In other examples at least one of the communication control unit 304, the communication unit 305, and the sound wave acquiring unit 308 may be omitted as long as the output apparatus 102 is capable of outputting a sound wave including the speaker ID of the output apparatus 102.

(Hardware Configuration of Terminal Apparatus)

Figure 4:
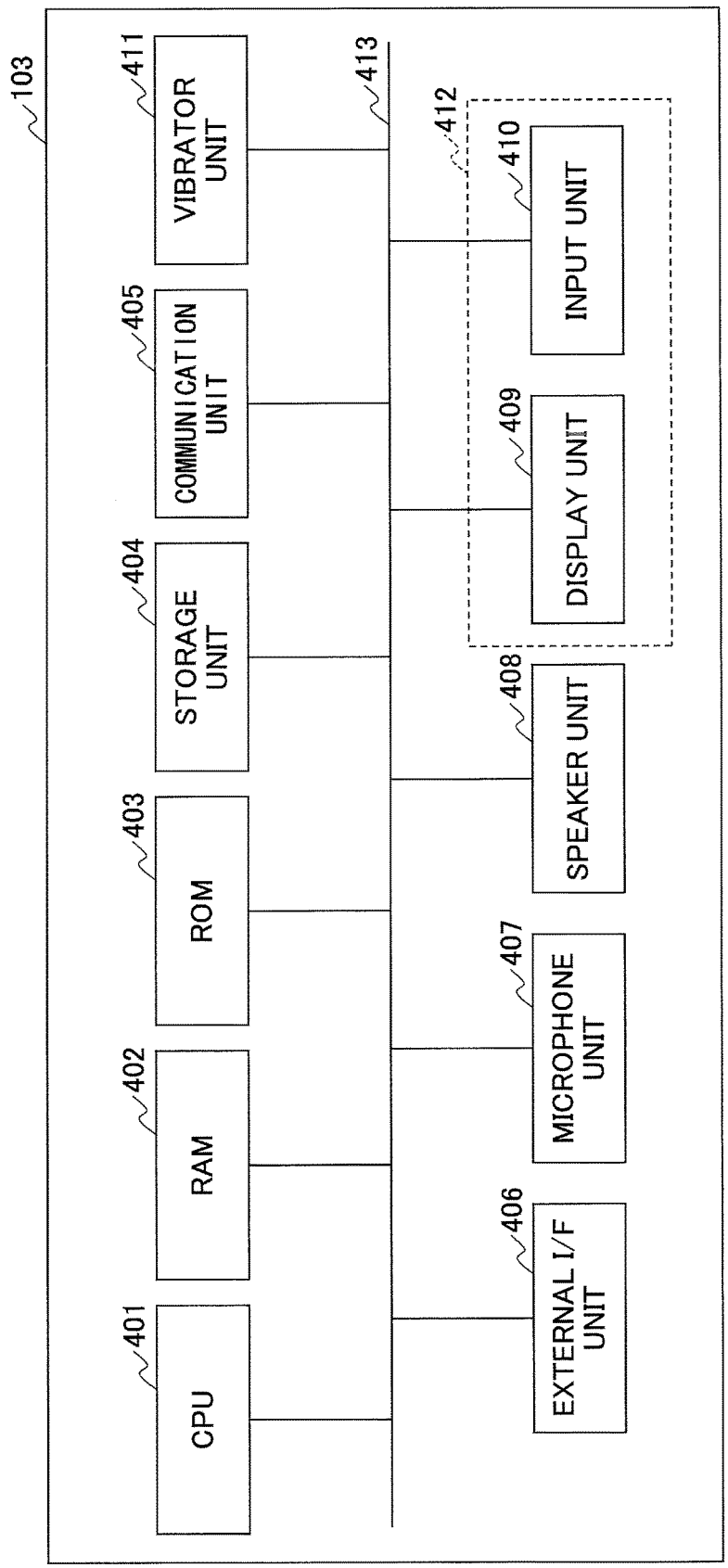
FIG. 4 illustrates an exemplary hardware configuration of a terminal apparatus according to the first embodiment.

FIG. 4 is a block diagram illustrating an exemplary hardware configuration of the terminal apparatus 103 according to the present embodiment. In FIG. 4, the terminal apparatus 103 has a configuration of a general computer including a CPU 401, a RAM 402, a ROM 403, a storage unit 404, a communication unit 405, an external I/F unit 406, a microphone 407, a speaker 408, a display unit 409, an input unit 410, a vibrator unit 411, and a bus 413.

The CPU 401 reads programs and data stored in the ROM 403 and the storage unit 404, loads the read programs and/or data on the RAM 402, and executes processes for implementing various functions of the terminal apparatus 103. The RAM 402 is a volatile memory used as a working area for the CPU 401. The ROM 403 is a nonvolatile memory that is capable of retaining programs and data even when the power is turned off.

The storage unit 404 may be a storage device such as an HDD, an SSD, or a flash ROM that stores an OS, application programs, and various data, for example.

The communication unit 405 is a communication interface supporting a predetermined communication method such as a wireless LAN or a mobile communication network for 3G (3rd Generation) or LTE (Long Term Evolution), for example. The terminal apparatus 103 establishes connection with the network 105 via the communication unit 405 to perform data communication with the server apparatus 101 and the like.

The external I/F 406 is an interface with an external device. The external device includes, for example, a recording medium and the like. The terminal apparatus 103 may read and/or write data from/on the recording medium via the external I/F 306, for example. The recording medium may be a memory card such as a USB memory or the like.

The microphone unit 407 includes an audio pickup device such as a microphone. The microphone unit 407 converts a sound wave acquired by the microphone into an electric signal and further converts the signal into acoustic data in a predetermined format. Note that microphones included in smartphones of recent years have the capability to pick up sound waves of up to 20 kHz, or even 24 kHz in more preferred examples. Thus, the microphone unit 407 may be able to acquire the speaker ID that is converted into a high frequency signal of 16 kHz or more that is included in the sound wave output from the output apparatus 102, for example.

The speaker unit 408 includes an audio (sound wave) output apparatus such as a speaker. The speaker unit 408 converts audio data into an audio signal and further converts the audio signal into a sound wave to be output by the speaker, for example.

The display unit 409 includes a display device such as an LCD (Liquid Crystal Display) for displaying a display screen generated by a program executed by the terminal apparatus 103, for example. The input unit 410 may include, for example, an input device such as a touch panel for accepting an input operation made by a user. In some embodiments, the display unit 409 and the input unit 410 may be integrated into a display/input unit 412 such as an integrated touch panel display.

The vibrator unit 411 may be a vibration generating unit for informing a user of a certain event such as the reception of a call, an alarm, or information through vibration, for example. The bus 413 is connected to the various components described above and transmits address signals, data signals, and various control signals to the various components of the terminal apparatus 103.

Note that the terminal apparatus 103 may execute a predetermined program such as a program stored in a recording medium connected to the external I/F unit 406 or a program downloaded via the communication unit 405 by installing the program in the terminal apparatus 103 and running the program. For example, the terminal apparatus 103 may download and install an application program for implementing the information processing system 100 from the server apparatus 101 or the like, and execute the application program.

<Functional Configuration>

Figure 5:
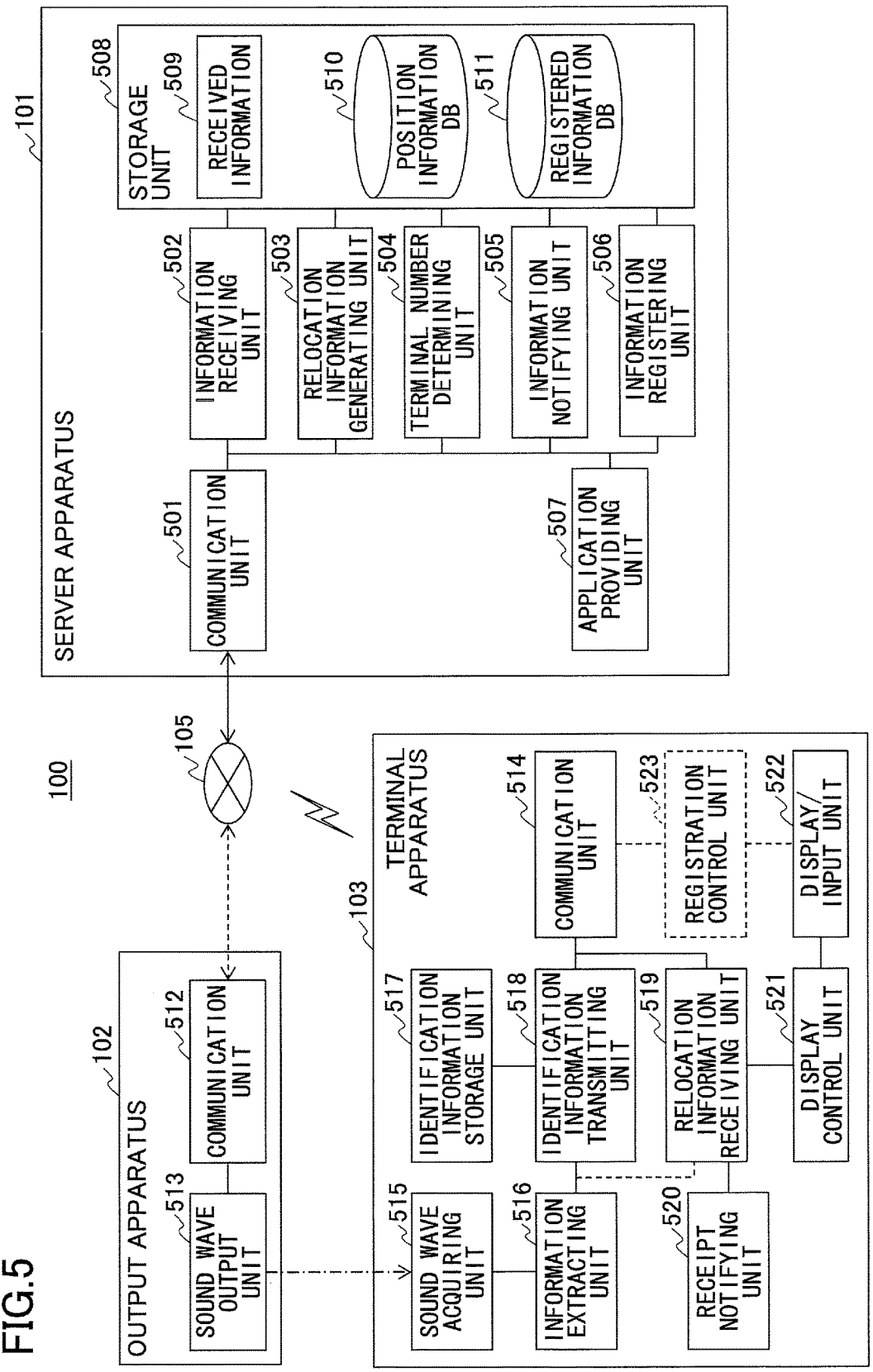
FIG. 5 is a block diagram illustrating a functional configuration of the information processing system according to the first embodiment.

FIG. 5 is a block diagram illustrating an exemplary functional configuration of the information processing system 100 according to the present embodiment. The information processing system 100 includes the server apparatus 101 and the output apparatus 102 that are connected to the network 105 and the terminal 103 that can establish connection with the network 105 by wireless communication. Note that although the information processing system 100 may include a plurality of output apparatuses 102 and a plurality of terminal apparatuses 103, in FIG. 5, for the sake of simplifying the illustration, only one output apparatus 102 and one terminal apparatus 103 are illustrated.

(Functional Configuration of Server Apparatus)

The server apparatus 101 may include a communication unit 501, an information receiving unit 502, a relocation information generating unit 503, a terminal apparatus number determining unit 504, an information notifying unit 505, an information registering unit 506, an application providing unit 507, and a storage unit 508, for example.

The communication unit 501 connects the server apparatus 101 to the network 105 and establishes data communication with the terminal apparatus 103, the output apparatus 102, and the like. The communication unit 501 may be implemented by the communication I/F unit 208 of FIG. 2, for example.

The information receiving unit 502 receives information sent from the terminal apparatus 103 or the output apparatus 102 via the communication unit 501. For example, the information receiving unit 502 may receive from the terminal apparatus 130 the terminal ID of the terminal apparatus 103 (example of terminal apparatus identification information) and the speaker ID acquired by the terminal apparatus 103 (example of output apparatus identification information). Also, the information receiving unit 502 may register the received terminal ID and speaker ID, the date/time the terminal ID and the speaker ID was acquired in a position information DB 510.

By referring to the position information DB 510, the server 101 may be able to identify the position of each terminal apparatus 103. Note that the position information DB 510 is described in detail below.

Also, upon receiving information other than the terminal ID and the speaker ID, the information receiving unit 502 may store the received information in the storage unit 508 as received information 509, for example.

The relocation information generating unit 503 generates evacuation route information to be notified to the terminal apparatus 103 based on the terminal ID of the terminal apparatus 103 and the speaker ID of the output apparatus 102 received by the information receiving unit 502. For example, the relocation information generating unit 503 may generate information on relocating from a current location (position) of the terminal apparatus 103 to a predetermined destination (e.g., evacuation area, emergency exit) or information on relocating to a next location.

Note that evacuation route information indicating an evacuation route is one example of relocation information. That is, relocation information does not necessarily have to be information relating to evacuation as long as it includes information on moving from a current position of the terminal apparatus 103 to a predetermined destination or moving toward a next location. Other possible examples of relocation information may include information for moving to a shop, a restaurant, or a restroom that is not so crowded, and guidance information for dispersing crowds and guiding them to an exit at an event site, for example.

The terminal apparatus number determining unit 504 determines the number of terminal apparatuses 103 corresponding to the different positions of the plurality of output apparatuses 102 based on the terminal IDs and the speaker IDs received from the plurality of terminal apparatuses 103 by the information receiving unit 502. For example, the terminal apparatus number determining unit 504 may determine the number of terminal apparatuses 103 in the vicinity of an area where a certain output unit 102 is installed.

Note that although a numerical value indicating the number of terminal apparatuses 103 is contemplated as the terminal apparatus number to be determined by the terminal apparatus number determining unit 504 in the present embodiment, in other embodiments, the terminal apparatus number may be information providing a rough indication of the number of terminal apparatuses 103 such as an indication that the number is less than a predetermined number or at least a predetermined number, for example.

The information notifying unit 505 notifies the terminal apparatus 103 of the evacuation route generated by the relocation information generating unit 503, for example, based on the terminal ID of the terminal apparatus 103 and the speaker ID of the output apparatus 102 received by the information receiving unit 502.

Note that the information conveyed to the terminal apparatus 103 by the information notifying unit 505 does not necessarily have to be evacuation route information generated by the relocation information generating unit 503. For example, information on a plurality of evacuation routes may be stored in advance in association with corresponding evacuation route numbers in a memory of the terminal apparatus 103 (such as the storage unit 404 in FIG. 4). The information notifying unit 505 may notify the terminal apparatus 103 of an evacuation route number instead of the evacuation route information generated by the relocation information generating unit 503. With such a configuration, the amount of data exchanged between the server apparatus 101 and the plurality of terminal apparatuses 103 may be reduced, and the load of the server apparatus 101 for generating the evacuation route information may be reduced, for example.

Note that the information on the plurality of evacuation routes and the corresponding evacuation route numbers that are stored in advance in the terminal apparatus 103 may be provided by the app for implementing the information processing system 100 that is provided by the application providing unit 507 as described below.

Also, the information notifying unit 505 may convey information other than evacuation route information. For example, the information notifying unit 505 may notify the output apparatus 102 of the speaker ID received by the information receiving unit 502.

The information registering unit 506 registers the terminal apparatus 103 with the information processing system 100. For example, a user using the building 106 for the first time may download and install an application (app) for implementing the information processing system 100 in his/her terminal apparatus 103. The user may then start the app and perform operations for registering the terminal apparatus 103. For example, the user may enter the terminal ID of the terminal apparatus 103 (e.g., telephone number of the terminal apparatus 103) in a registration screen of the app. Once the terminal ID is entered, the app of the terminal apparatus 103 may send the entered terminal ID of the terminal apparatus 103 to the server apparatus 101.

When the information registering unit 506 receives the terminal ID of the terminal apparatus 103 transmitted from the terminal apparatus 103 via the communication unit 501, it registers the received terminal ID of the terminal apparatus 103 in the registered information DB 511. Note that the registered information DB 511 is described in detail below.

The application providing unit 507 provides the app for implementing the information processing system 100 to the terminal apparatus 103. For example, the application providing unit 507 may have a web server function for providing the app corresponding to the information processing system 100.

Note that the information receiving unit 502, the relocation information generating unit 503, the terminal apparatus number determining unit 504, the information notifying unit 505, the information registering unit 506, and the application providing unit 507 described above may be implemented by the CPU 201 of FIG. 2 running a relevant program, for example.

The storage unit 508 may store the received information 509 received by the information receiving unit 502, the position information DB 510, and the registered information DB 511, for example. The storage unit 508 may be implemented by the storage unit 204 and/or the RAM 202 of FIG. 2, for example.

(Functional Configuration of Output Apparatus)

In the present embodiment, the output apparatus 102 includes a communication unit 512 and a sound wave output unit 513.

The communication unit 512 connects the output apparatus 102 to the network 105 to enable data communication with the server apparatus 101 and the like. The communication unit 512 receives predetermined information transmitted from the server apparatus 101 (e.g., speaker ID). The communication unit 512 may be implemented by the communication unit 305 and the communication control unit 304 of FIG. 3, for example.

The sound wave output unit 513 outputs a sound wave including predetermined information. For example, the sound wave output unit 513 may output a sound wave including information such as evacuation route information and/or the speaker ID received from the server apparatus 101 via the communication unit 512. Alternatively, the sound wave output unit 513 may output a sound wave including the speaker ID of the output apparatus 102 that is stored in advance, for example. The sound wave output unit 513 may be implemented by the sound wave output unit 307, the sound wave control unit 306, the flash ROM 303, and the CPU 301 running a relevant program, for example.

(Functional Configuration of Terminal Apparatus)

In the present embodiment, the terminal apparatus 103 includes a communication unit 514, a sound wave acquiring unit 515, an information extracting unit 516, an identification information storage unit 517, an identification information transmitting unit 518, a relocation information receiving unit 519, a receipt notifying unit 520, a display control unit 521, and a display/input unit 522. Preferably, the terminal apparatus 103 also includes a registration control unit 523.

The communication unit 514 connects the terminal apparatus 103 to the network 105 to enable data communication with the server apparatus 101 and the like. The communication unit 501 may be implemented by the communication unit 405 of FIG. 4, for example.

The sound wave acquiring unit 515 acquires the sound wave output by the output apparatus 102. For example, the sound wave acquiring unit 515 may be implemented by the microphone unit 407 of FIG. 4, for example.

The information extracting unit 516 extracts the predetermined information included in the sound wave acquired by the sound wave acquiring unit 515. For example, the information extracting unit 516 may extract the speaker ID of the output apparatus 102 included in the sound wave acquired by the sound wave acquiring unit 515. Also, if evacuation route information is included in the sound wave acquired by the sound wave acquiring unit 515, the information extracting unit 516 may extract the evacuation route information included in the sound wave. The information extracting unit 516 may be implemented by the CPU 401 running a relevant program (app), for example.

The identification information storage unit 517 stores the terminal ID (terminal apparatus identification information) unique to each terminal apparatus 103, for example. The identification information storage unit 517 may be implemented by the storage unit 404, and the ROM 403 of FIG. 4, for example.

The identification information transmitting unit 518 transmits the terminal ID of the terminal apparatus 103 stored in the identification information storage unit 517 and the speaker ID of the output apparatus 102 extracted by the information extracting unit 516 to the server apparatus 101 via the communication unit 514. The identification information transmitting unit 518 may be implemented by the CPU 401 of FIG. 4 running a relevant program, for example.

The relocation information receiving unit 519 may receive the evacuation route information (relocation information) transmitted from the server apparatus 101 via the communication unit 514, for example. Alternatively, the relocation information receiving unit 519 may receive the evacuation route information transmitted from the server apparatus 101 via the output apparatus 102, the sound wave acquiring unit 515, and the information extracting unit 516, for example. The relocation information receiving unit 519 may be implemented by the CPU 401 of FIG. 4 running a relevant program, for example.

The receipt notifying unit 520 notifies the user that the evacuation route information has been received when the relocation information receiving unit 519 receives the evacuation route information. For example, upon receiving the evacuation route information, the receipt notifying unit 520 may notify the user to that effect by generating a predetermined vibration pattern, a predetermined sound, a predetermined display screen, or the like. The receipt notifying unit 520 may be implemented by the vibrator unit 411, the speaker unit 408, the display unit 409, and the CPU 401 running a relevant program, for example.

The display control unit 521 displays a display screen based on the evacuation route information received by the relocation information receiving unit 519. The display control unit 521 may be implemented by the CPU 401 of FIG. 4 running a relevant program, for example.

The display/input unit 522 may be controlled by the display control unit 521 to display a display screen indicating the evacuation route information and accept an input operation made by the user, for example. Also, the display/input unit 522 may be controlled by the registration control unit 523 to display a registration screen for the terminal apparatus 103 and accept an input operation made by the user, for example. The display/input unit 522 may be implemented by the display unit 409, the input unit 410, and the display/input unit 412 of FIG. 4, for example.

The registration control unit 523 controls operations for registering the terminal apparatus 103 with the information processing system 100. For example, as described above, a user using the building 106 for the first time may start the app corresponding to the information processing system 100 to perform an operation for registering the terminal apparatus 103. In this case, the registration control unit 523 may control the display/input unit 522 to display the registration screen and accept an input of a terminal ID of the terminal apparatus 103 entered by the user. Also, the registration control unit 523 may transmit the accepted terminal ID to the server apparatus 101 via the communication unit 514.

With such a configuration, the terminal apparatus 103 may transmit the speaker ID of the output apparatus 102 and the terminal ID of the terminal apparatus 103 included in the sound wave output by the output apparatus 102 to the server apparatus 101. Also, upon receiving evacuation route information from the server apparatus 101, the terminal apparatus 103 may notify the user that it has received the evacuation route information and display a display screen based on the evacuation route information.

In the following, the registered information DB 511 and the position information DB 510 that are stored in the storage unit 508 are described in greater detail.

(Registered Information DB)

FIGS. 6A-6C illustrate examples of information included in the registered information DB 511 according to the first embodiment. The registered information DB 511 may include terminal registration information 601, output apparatus correspondence information 604, and output apparatus layout information, for example.

FIG. 6A illustrates an example of the terminal registration information 601. The terminal registration information 601 may include a terminal ID 602 and a registration date/time 603 of the terminal ID 602 as information items, for example. The terminal ID 602 is preferably address information such as a telephone number, an IP (Internet Protocol) address, or a URL (Uniform Resource Locator) of a terminal apparatus 103 that can be used to notify the terminal apparatus 103 of an evacuation route. In response to a registration operation performed on an app running on a given terminal apparatus 103, the information registering unit 506 of the server apparatus 101 registers the terminal ID 602 of the terminal apparatus 103 that is transmitted from the terminal apparatus 103 and the corresponding registration date/time 603 as the terminal registration information 601 in the registered information DB 511.

Note that the terminal ID 602 is an example of terminal apparatus identification information of the terminal apparatus 103. Note that the terminal apparatus identification information of the terminal apparatus 103 does not necessarily have to be information indicating the address of the terminal apparatus 103 as long as it is a value unique to each terminal apparatus 103. For example, in an environment such as an office building, the terminal apparatus identification information of the terminal apparatus 103 may be an employee ID of the user of the terminal apparatus 103.

In this case, the terminal registration information 601 may include the employee ID, address information of the terminal apparatus 103, and the registration date/time 603 stored in association with each other, for example. Alternatively, association information between the employee ID of the user and the terminal ID 602 may be separately stored, for example. In this way, in an office building, the information processing system 100 may be able to acquire information on the users of the terminal apparatuses 103 in addition to acquiring information on the position and the number of the terminal apparatuses 103 in the building 106, for example.

FIG. 6B illustrates an example of output apparatus correspondence information 604. The output apparatus correspondence information 604 includes a location 605 of an output apparatus 102 and a speaker ID 606 of the output apparatus 102 stored in association with each other. For example, an administrator of the information processing system 100 may register in advance the locations 605 of the plurality of output apparatuses 102 installed in the building 106 in association with their corresponding speaker IDs 606 as the output apparatus correspondence information 604 in the registered information DB 511.

FIG. 6C illustrates an example of layout information of the output apparatuses 102. The layout information of the output apparatuses 102 may include map information indicating a floor layout of the building 106 and information indicating the locations 605 of the output apparatuses 102. For example, in FIG. 6C, ① represents "point 1" where the output apparatus 102 with the speaker ID "SP00001" is located. Similarly, in FIG. 6C, ② represents "point 2" where the output apparatus 102 with the speaker ID "SP00002" is located. Further, ③ to ⑨ of FIG. 6C represent the locations 605 (points 3-9) of the output apparatuses 102 in a similar manner.

(Position Information DB)

FIGS. 7A and 7B illustrate examples of information included in the position information DB 510 according to the first embodiment. The location information DB 510 may include terminal apparatus position information 701 and terminal apparatus number information 706, for example.

FIG. 7A illustrates an example of the terminal apparatus position information 701. The terminal apparatus position information 701 includes a speaker ID 702 and a terminal ID 703 received from the terminal apparatus 103 by the information receiving unit 502, an acquisition date/time 705 thereof, and a location 704 corresponding to the received speaker ID 702 stored in association with each other. By referring to the terminal apparatus position information 701, the server apparatus 101 may be able to determine the locations 704 of the terminal apparatuses 103 at the acquisition date/time 705.

FIG. 7B illustrates an example of the terminal apparatus number information 706. The terminal apparatus number information 706 may include the number of terminal apparatuses 103 located at each point (points 1-9) in addition to the output apparatus layout information of FIG. 6C. Based on the terminal apparatus position information 701, the terminal apparatus number determining unit 504 of the server apparatus 101 determines the number of terminal apparatuses 103 located at each point and generates the terminal apparatus number information 706.

Note that in the example of FIG. 7B, the terminal apparatus number information 706 is represented by the number of users (evacuating persons) of the terminal apparatuses 103 at each point in order to enable the users of the information processing system 100 to intuitively understand the information. However, FIG. 7B is merely one illustrative example of the terminal apparatus number information 706, and in other examples, the terminal apparatus number information 706 may be represented by the number of terminal apparatuses 103 at each point.

By storing the terminal apparatus number information 706, the server apparatus 101 may be able to determine the number of terminal apparatuses 103 at each point within the building 106.

<Process Flow>

In the following, a process flow of the information processing system 100 is described.

(Evacuation Route Notification Process)

FIG. 8 is a flowchart illustrating an exemplary evacuation route notification process according to the first embodiment.

In step S801, the sound wave output unit 513 of the output apparatus 102 transmits (outputs) a sound wave including the speaker ID of the output apparatus 102. Note that in some embodiments, the output apparatus 102 may be configured to continuously output the sound wave including the speaker ID of the output apparatus 102.

In step S802, the user of the terminal apparatus 103 starts the app corresponding to the information processing system 100 that is installed in the terminal apparatus 103.

In step S803, when the app is started, the terminal apparatus 103 acquires the speaker ID included in the sound wave output from the output apparatus 102. For example, the sound wave acquiring unit 515 of the terminal apparatus 103 may acquire the sound wave output from the output apparatus 102, and the information extracting unit 516 may extract the speaker ID included in the acquired sound wave.

In step S804, the identification information transmitting unit 518 of the terminal apparatus 103 transmits the terminal ID of the terminal apparatus 103 stored in the identification information storage unit 517 and the speaker ID extracted by the information extracting unit 516 to the server apparatus 101 via the communication unit 514.

In step S805, the information receiving unit 502 of the server apparatus 101 receives the speaker ID and the terminal ID transmitted from the terminal apparatus 103.

In step S806, the information receiving unit 502 of the server apparatus 101 stores the received speaker ID and terminal ID, and the date/time the information was acquired (received) in the position information DB 510 of the storage unit 508, for example.

In step S807, the server apparatus 101 determines whether an evacuation alarm has been generated indicating that a disaster such as a fire has occurred in the building 106 (event occurrence information), for example. If there is no evacuation alarm, the server apparatus 101 returns to step S803 and repeats the same process steps.

On the other hand, if an evacuation alarm is detected, the process proceeds to step S808, and the server apparatus 101 acquires information indicating the disaster location. Note that information indicating whether an evacuation alarm has been generated and the disaster location may be conveyed from a fire detector or a disaster prevention center to the information processing system 101 via the network 105, for example. Alternatively, information indicating whether an evacuation alarm has been generated and the disaster location may be conveyed from a fire detector or a disaster prevention center to an administrator of the information processing system 100, and the administrator may then input the information to the information processing system 100, for example.

In step S809, the relocation information generating unit 503 of the server apparatus 101 may generate the terminal apparatus number information 706 as illustrated in FIG. 7B, for example, and store the generated information in the position information DB 510.

In step S810, the relocation information generating unit 503 of the server apparatus 101 generates evacuation route information to be notified to the terminal apparatus 103. Note that the process of generating the evacuation route information is described in greater detail below.

In step S811, the information notifying unit 505 of the server apparatus 101 transmits (notifies) the evacuation route information generated by the relocation information generating unit 503 to the terminal apparatus 103. The information transmitted (notified) to the terminal apparatus 103 may include identification information indicating that the notified information corresponds to evacuation route information (e.g., evacuation information flag), output apparatus position information of the output apparatuses 102 (e.g. speaker ID list), and evacuation route information indicating an evacuation route, for example.

In this case, the information notifying unit 505 may directly notify the terminal apparatus 103 of the evacuation route information through the communication unit 501, for example. Also, the information notifying unit 505 may transmit the evacuation route information to the output apparatus 102 such that the terminal apparatus 103 may be notified of the evacuation route information via the output unit 102. The information notifying unit 505 notifies the evacuation route information using at least one of the indirect notification method via the output apparatus 102 and the direct notification method of directly notifying the evacuation route information to the terminal apparatus 103. Note that in the case where the information notifying unit 505 notifies the evacuation route information via the output apparatus 102, in step S812, the output apparatus 102 receives the evacuation route information from the server apparatus 101, and outputs (transmits) a sound wave that includes the received evacuation route information to the terminal apparatus 103.

In step S813, the terminal apparatus 103 receives the evacuation route information from the server apparatus 101 or the output apparatus 102, and in response, the receipt notifying unit 520 notifies the user that the evacuation route information has been received. The display control unit 521 controls the display/input unit 522 to display a display screen based on the received evacuation route information. Then, the process proceeds to an evacuation guidance process after acquiring the evacuation route information that is illustrated in FIG. 9 (step S814).

(Evacuation Guidance Process after Evacuation Route Acquisition)

Figure 9:
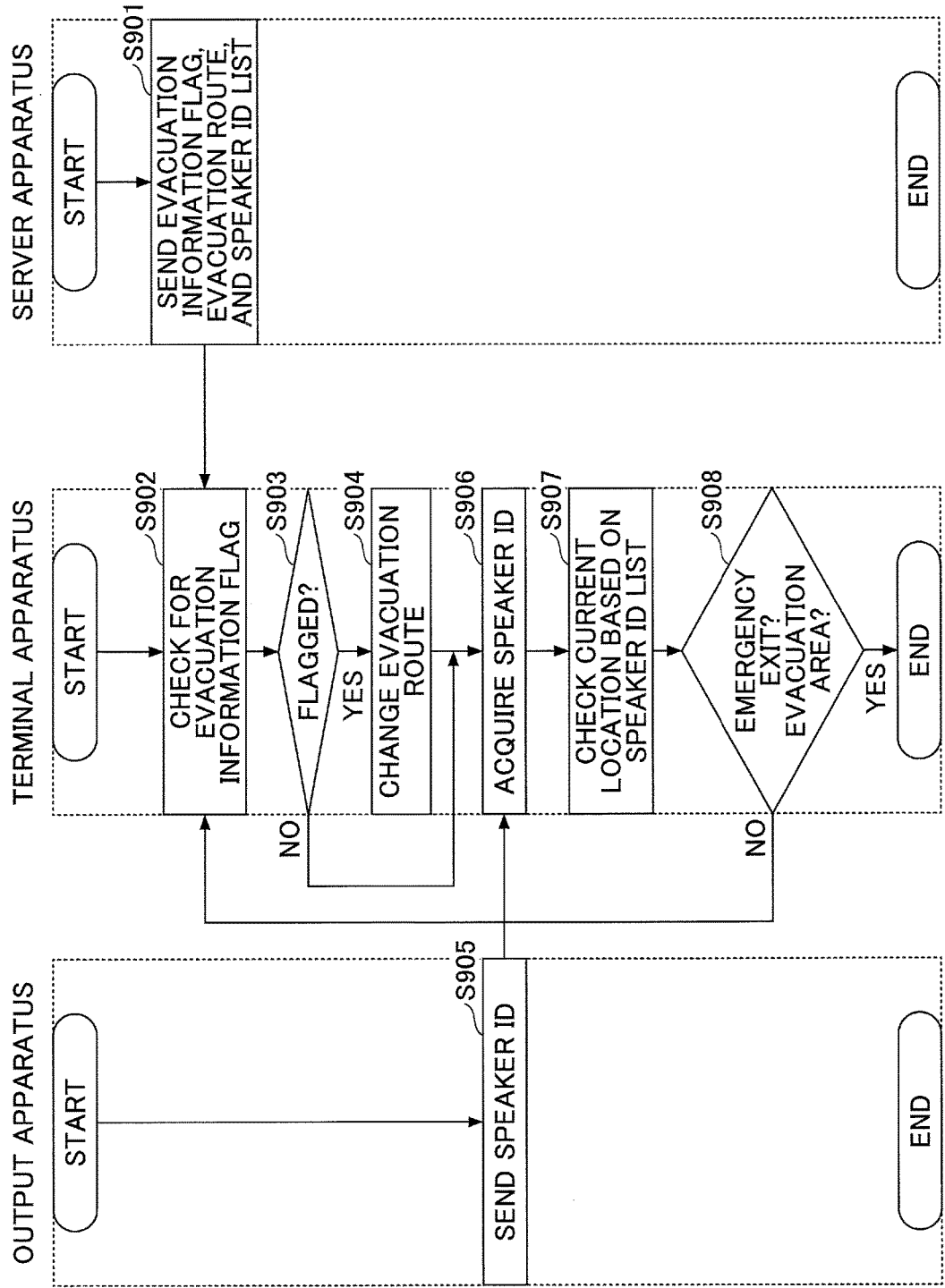
FIG. 9 is a flowchart illustrating an exemplary evacuation guidance process after evacuation route acquisition according to the first embodiment.

FIG. 9 is a flowchart illustrating an exemplary evacuation guidance process after the evacuation route information is acquired according to the first embodiment.

In step S901, the information notifying unit 505 of the server apparatus 101 transmits (notifies) information including the evacuation route information generated by the relocation information generating unit 503 to the terminal apparatus 103. For example, the server apparatus 101 may update the evacuation route information according to a predetermined condition (e.g. at one minute intervals) and notify the terminal apparatus 103 if the updated evacuation route information includes an evacuation information flag.

In step S902, the terminal apparatus 103 receives the information from the server apparatus 101 and checks whether an evacuation information flag is included in the received information. That is, the terminal apparatus 103 determines whether the received information corresponds to evacuation route information.

In step S903, if the information received from the server apparatus 101 includes an evacuation information flag, in step S904, the terminal apparatus 103 changes (updates) an evacuation route display that is displayed by the display/input unit 522. On the other hand, if the terminal apparatus 103 determines in step S903 that the information received from the server apparatus 101 does not include an evacuation information flag, the terminal apparatus 103 does not update the evacuation route display.

In step S905, the output apparatus 102 transmits (outputs) a sound wave including the speaker ID of the output apparatus 102. For example, the output apparatus 102 may be configured to continuously output the sound wave including the speaker ID of the output apparatus 102.

In step S906, the terminal apparatus 103 acquires the speaker ID included in the sound wave output by the output apparatus 102.

In step S907, the terminal apparatus 103 refers to the output apparatus position information (speaker ID list) received in step S811, for example, to check its current position.

In step S908, the terminal apparatus 103 determines whether its current position corresponds to a predetermined destination such as an evacuation area or an emergency exit indicated by the evacuation route information. If the current position corresponds to the predetermined destination indicated by the evacuation route information, the terminal apparatus 103 terminates the present process. On the other hand, if the current position does not corresponds to the predetermined destination indicated by the evacuation route information, the terminal apparatus 103 returns to step S902 and repeats the same process steps described above.

<Guidance Process Example>

In the following, a specific example of the evacuation route guidance process is described.

For example, when a disaster such as a fire occurs in the building 106, an administrator of the information processing system 100 may be notified of the occurrence of the disaster (event occurrence information) by a fire detector or a disaster prevention center, for example. Alternatively, the event occurrence information may be automatically transmitted (notified) to the server apparatus 101 via the network 105, for example.

For example, in this way, when the information processing system 100 detects the occurrence of a disaster, the relocation information generating unit 503 of the server apparatus 101 may generate the terminal apparatus number information 706 as illustrated in FIG. 7B and generate evacuation route information for evacuating the building 106 while avoiding the location where the disaster has occurred (disaster source location), for example.

Figure 10:
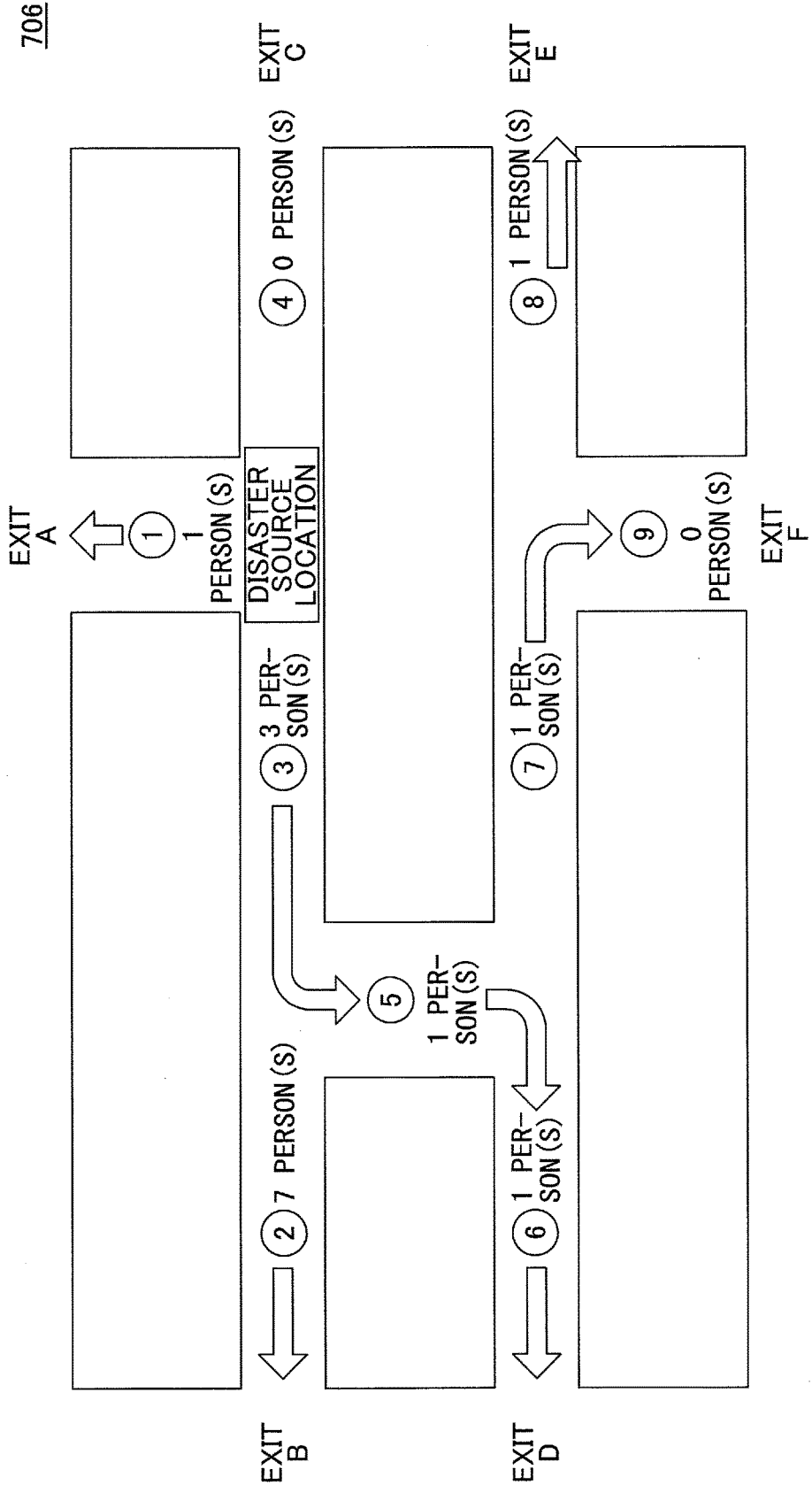
FIG. 10 illustrates an example of generating evacuation route information according to the first embodiment.

FIG. 10 is a diagram illustrating an example of generating evacuation route information according to the first embodiment. In the example of FIG. 10, the terminal apparatus number information 706 indicates where the disaster has occurred ("disaster source location"). The arrows in the drawing indicate evacuating directions of evacuation routes generated by the relocation information generating unit 503. As illustrated in FIG. 10, the relocation information generating unit 503 of the server apparatus 101 basically generates evacuation routes for guiding the terminal apparatuses 103 (evacuating persons) to move in directions away from the disaster source location.

For example, with respect to the user of the terminal apparatus 103 located at point 1 in FIG. 10, evacuation route information for guiding the user to move toward exit A may be generated and notified. Note that the terminal apparatus 103 located at point 1 may be identified based on the terminal apparatus position information 701 illustrated in FIG. 7A, for example.

Also, with respect to the seven users of the seven terminal apparatuses 103 located at position 2 in FIG. 10, evacuation route information for guiding the users to move toward exit B may be generated and notified. Note that the seven terminal apparatuses 103 located at point 2 may similarly be identified based on the terminal apparatus position information 701 of FIG. 7A, for example.

The three users of the three terminal apparatuses 103 located at position 3 may have a plurality of options including evacuating to exit B, exit D, or exit F, for example. In the example of FIG. 10, exit B corresponds to the nearest exit from point 3, but seven users are already heading in the direction toward exit B. Thus, evacuation may be delayed if the users at point 3 are also guided in the direction toward exit B. On the other hand, no more than two users are heading in the directions toward exit D and exit F. In such a case, it is preferable for the relocation information generating unit 503 of the server apparatus 101 to generate evacuation route information for guiding the users of the terminal apparatuses 103 at point 3 to exit D or exit F. In the example of FIG. 10, evacuation route information for guiding the users to exit D is generated with respect to the users of the terminal apparatuses 103 located at point 3.

In this way, the relocation information generating unit 503 of the server apparatus 101 generates evacuation route information for the terminal apparatuses 103 located at each point of the terminal apparatus position information 701 according to their positions.

Note that the information notifying unit 505 of the server apparatus 101 may transmit (notify) the evacuation route information to each terminal apparatus 103 via the network 105, for example. Alternatively, the information notifying unit 505 of the server apparatus 101 may transmit the evacuation route information to the output apparatuses 102 installed at the different locations, and the terminal apparatuses 103 may be notified of the evacuation route information via the output apparatuses 102. Further, the information notifying unit 505 of the server apparatus 101 may implement both of the above notification methods to convey the evacuation route information to the terminal apparatuses 103.

Upon receiving the evacuation route information from the server apparatus 101, the terminal apparatus 103 may notify the user that the evacuation route information has been received using, for example, a vibrator, an alarm sound, a display screen, or the like. Further, the display control unit 521 of the terminal apparatus 103 controls the display/input unit 522 to display a corresponding display screen based on the evacuation route information.

Figure 11A:
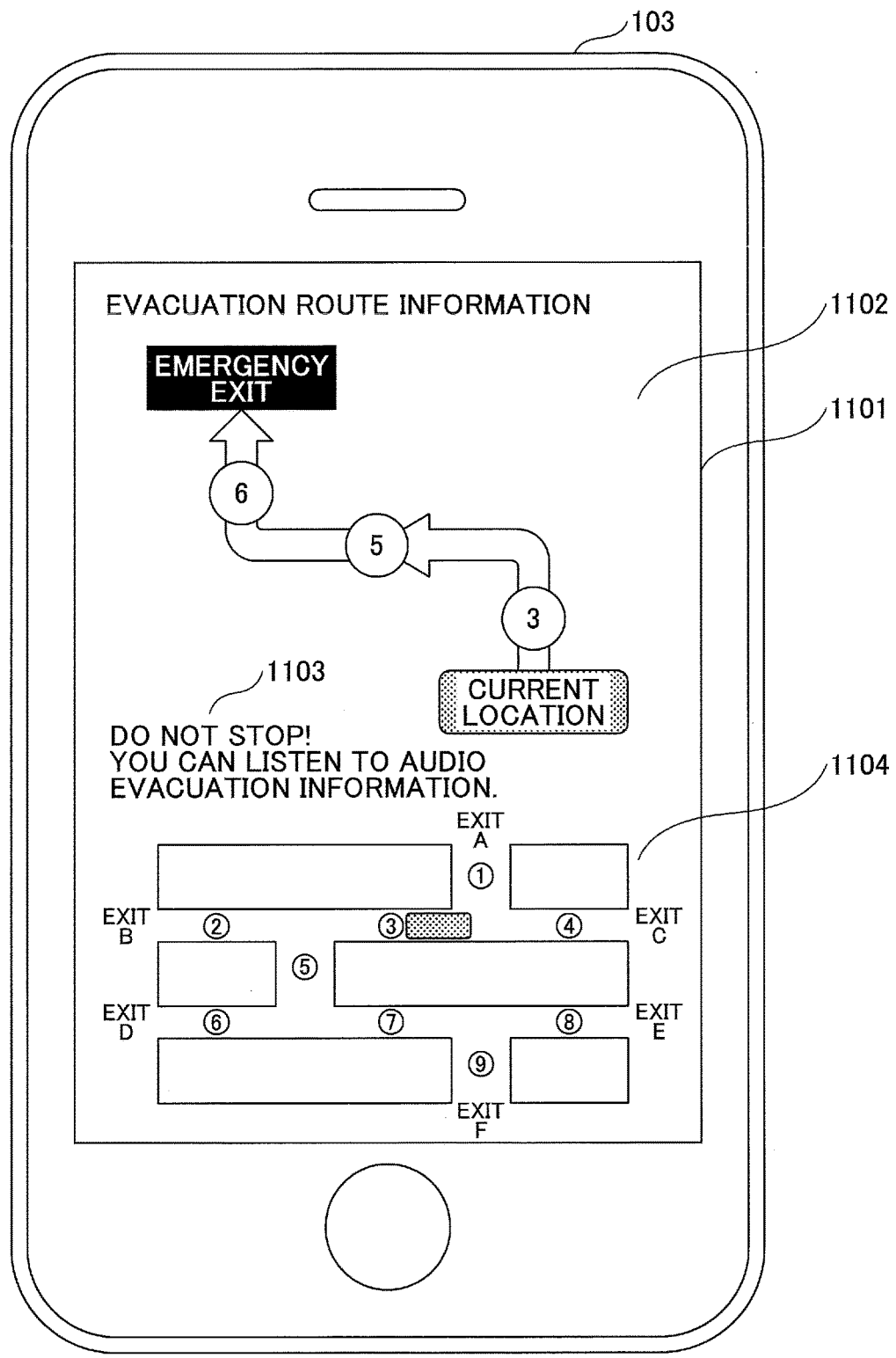
FIGS. 11A and 11B illustrate an example of evacuation route information according to the first embodiment.
Figure 11B:
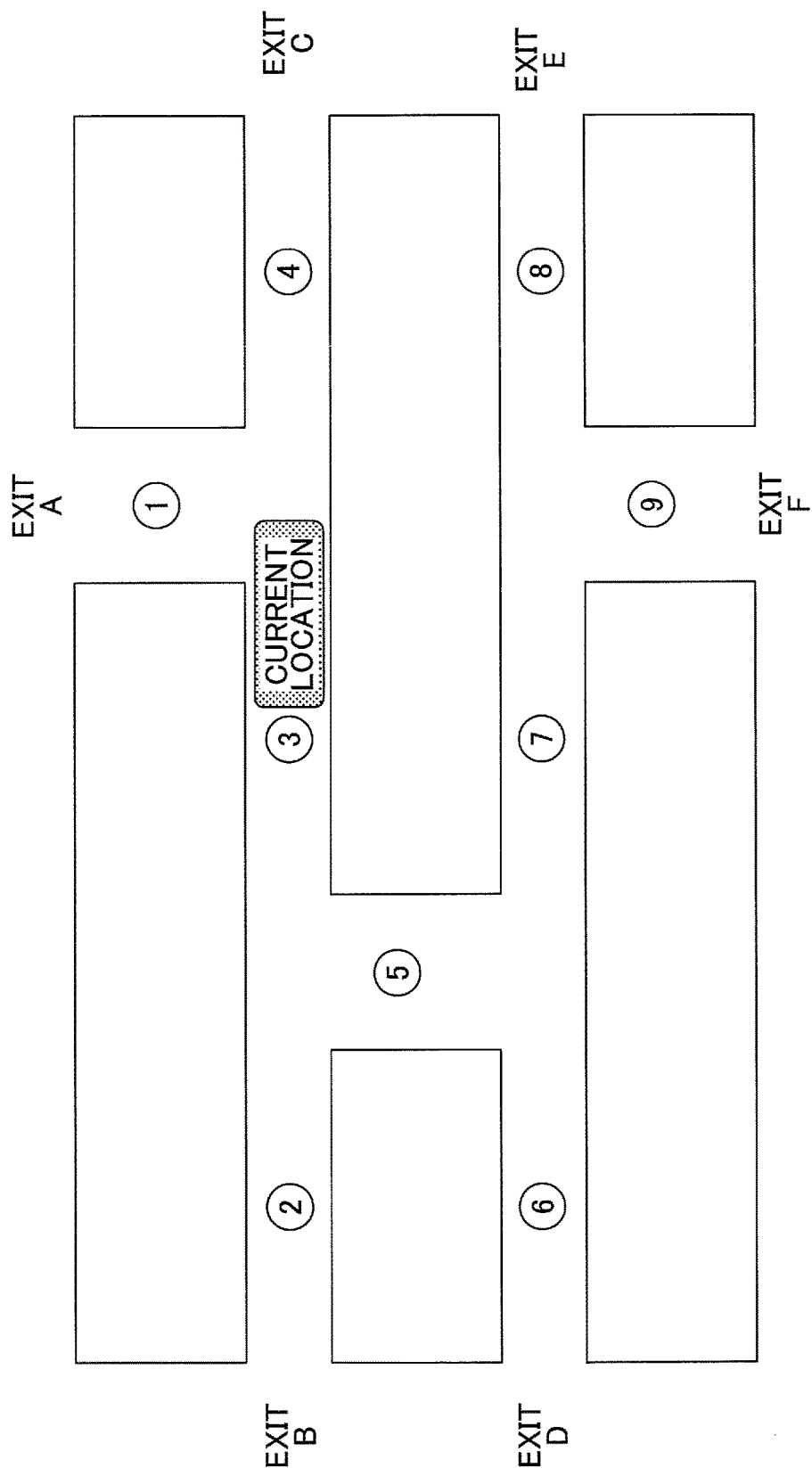

FIGS. 11A and 11B illustrate an example of the evacuation route information according to the first embodiment. FIG. 11A illustrates an example of a display screen 1101 based on the evacuation route information that is displayed at the terminal apparatus 103. In the example of FIG. 11A, the display/input unit 522 of the terminal apparatus 103 displays the display screen 1101 representing the evacuation route information. The display screen 1101 includes, for example, information 1102 indicating the evacuation route to an emergency exit, a message 1103, and a floor map 1104. Note that the circled numbers (③, ⑤, ⑥) indicated along the evacuation route to the emergency exit of the information 1102 represent positions where the output apparatuses 102 are installed. By referring to the information 1102 indicating the evacuation route and the floor map 1104, the user of the terminal apparatus 103 may be able to determine his/her position and in which direction he/she should be proceeding therefrom, for example.

FIG. 11B illustrates an example of the floor map 1104 of the display screen 1101 displaying the evacuation route information. The floor map 1104 includes information indicating the current location of the terminal apparatus 103, the location points ①-⑨ where the output apparatuses 102 are installed, and the exits A-E. Note that in some preferred embodiments, the floor map 1104 may be enlarged or displayed in full screen mode when the floor map 1104 displayed in the display screen 1101 is tapped, for example.

Also, the display screen 1101 of the evacuation route information preferably displays the message 1103 prompting the user not to remain in the current location (i.e., to keep on moving). Through the guidance process implemented by the information processing system 100, other evacuating persons may likely be heading toward the current location, and as such, by indicating the message 1103, collision with other evacuating persons and evacuation delay may be reduced, for example.

Figure 12A:
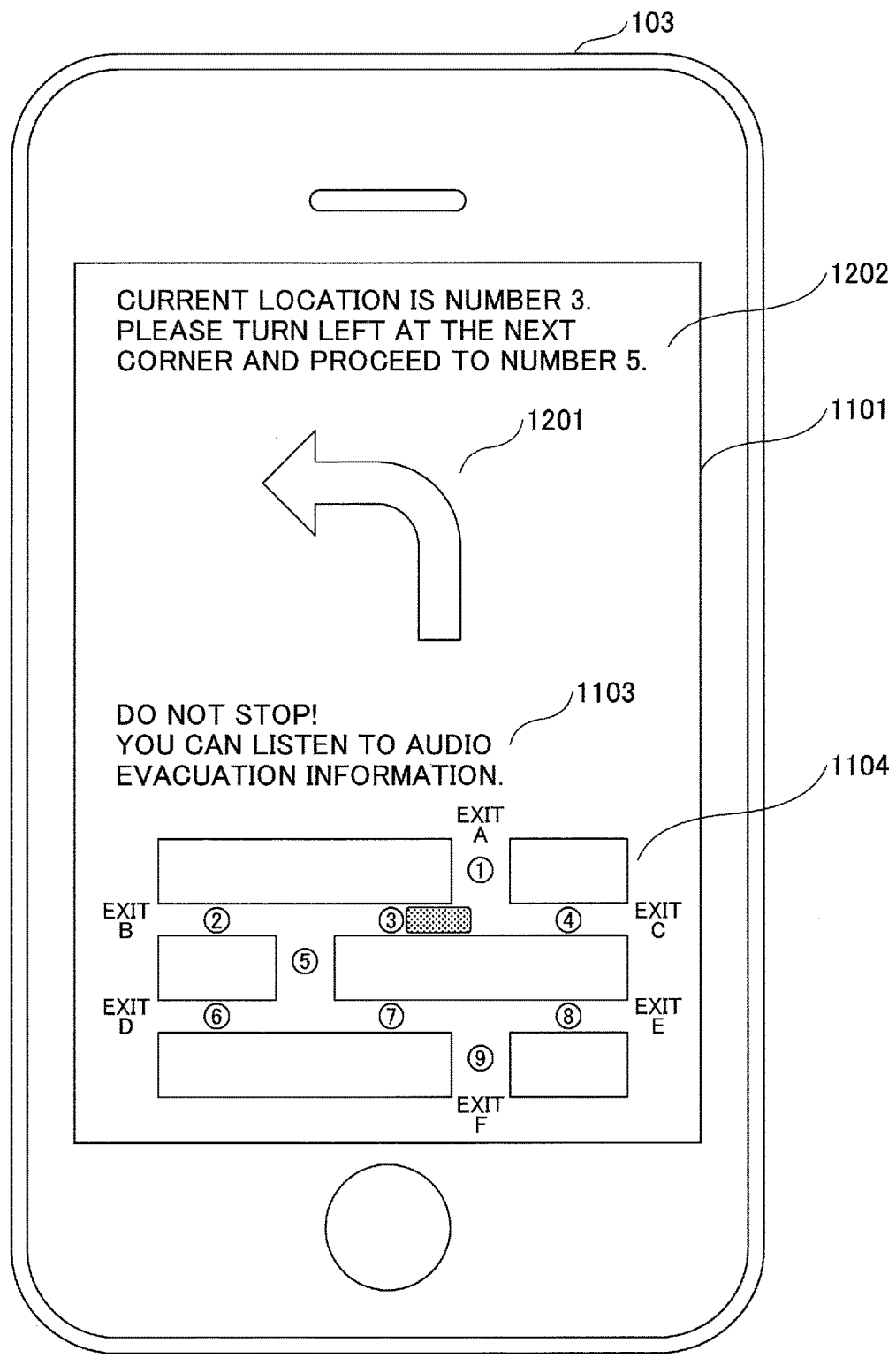
FIGS. 12A and 12B illustrate another example of evacuation route information according to the first embodiment.
Figure 12B:
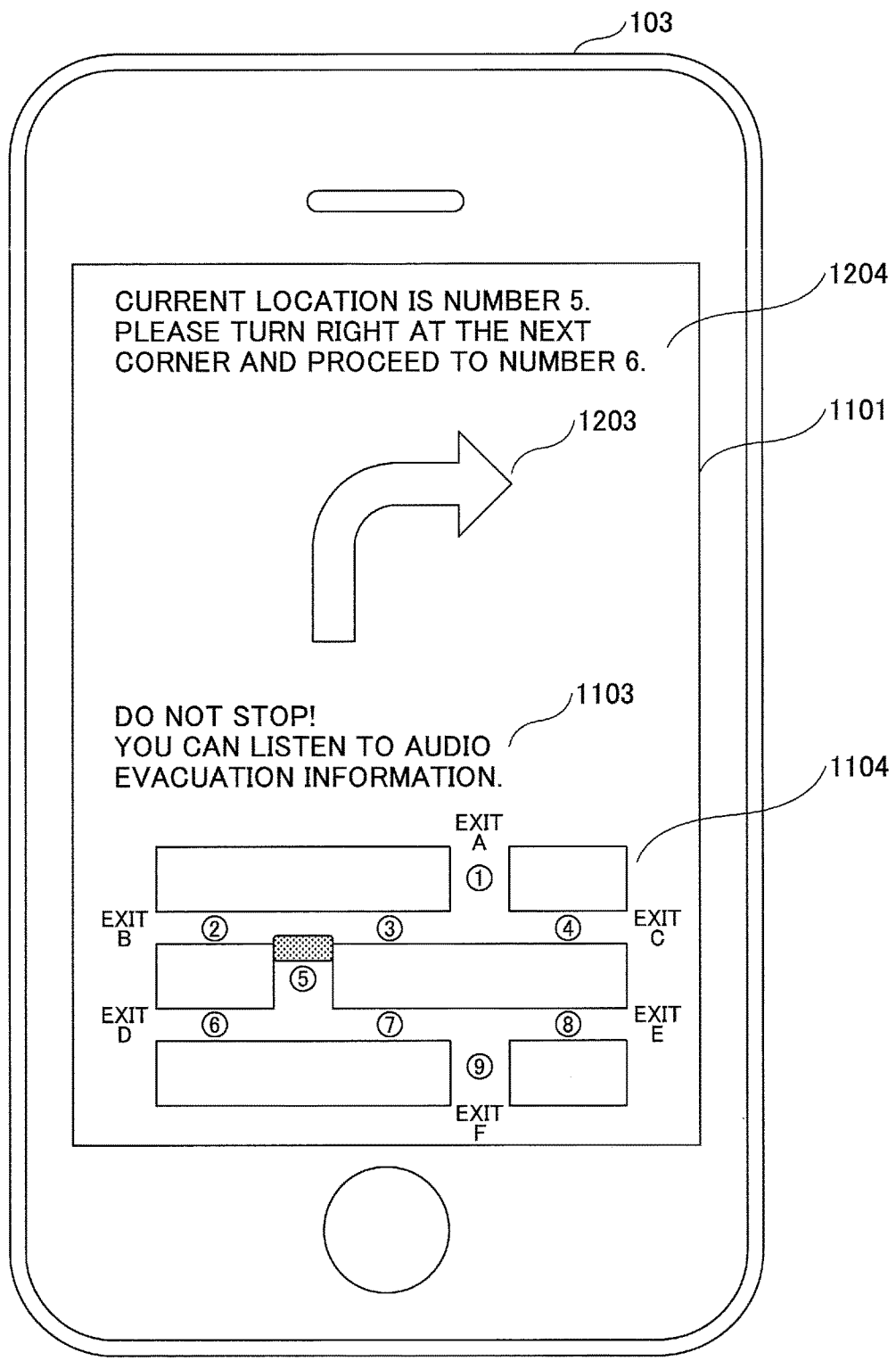

FIGS. 12A and 12B illustrate another example of the evacuation route information according to the first embodiment. In FIG. 12A, the display screen 1101 of the evacuation route information includes route information 1201 for moving from the current position at point 3 to point 5 corresponding to a next location, and a guidance message 1202. Once the user reaches point 5 following the route information 1201 displayed in the display screen 1101 of the evacuation route information, the display screen 1101 of the evacuation route information may be switched to display route information 1203 for moving from point 5 to point 6 corresponding to the next location and a guidance message 1204 as illustrated in FIG. 12B. In this way, the server apparatus 101 may be configured to display the evacuation route information as step-by-step instructions at the terminal apparatus 103.

For example, in the case where the evacuation route information for evacuating to the emergency exit as illustrated in FIG. 11A is displayed, a user accustomed to the building 106 may head toward the designated emergency exit without checking the evacuation route information that may be updated during evacuation. On the other hand, in the case where the evacuation route information is displayed in a step-by-step manner as illustrated in FIGS. 12A and 12B, for example, when confusion occurs at the designated emergency exit and evacuation is stalled as a result, the terminal apparatus 103 may notify the user of the appropriate evacuation route information according the circumstances, for example.

Modifications

Note that in the above-described example, the evacuation route information is presented to the user by a display screen. However, in other examples, the evacuation route information may be conveyed to the user using audio, vibration by a vibrator, and other various forms.

For example, with respect to a visually impaired user, the evacuation route information may be notified using audio as well as vibration of a vibrator. For example, Morse code may be used to prompt the user to evacuate, and the user may be further prompted to listen to audio of the evacuation route information.

Also, with respect to a hearing impaired user, evacuation route information may be issued in Morse code by a vibrator to guide the user to evacuate, for example.

Second Embodiment

According to a second embodiment of the present invention, the relocation information generating unit 503 of the server apparatus 101 is configured to generate evacuation route information according to a change in the number of the terminal apparatuses 103 at each point in the building 106.

Figure 13:
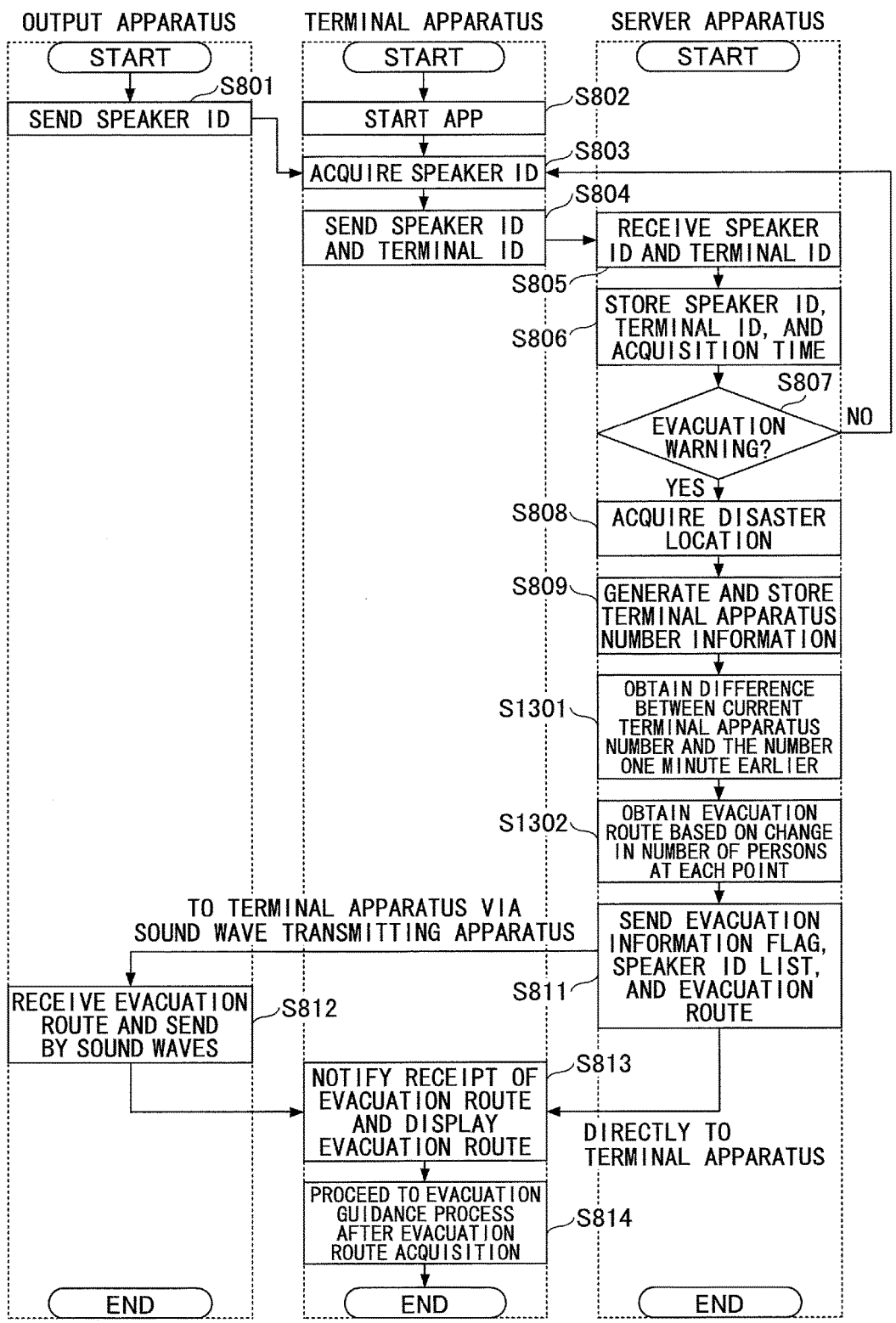
FIG. 13 is a flowchart illustrating an exemplary evacuation route notification process according to a second embodiment of the present invention.

FIG. 13 is a flowchart illustrating an exemplary evacuation route notification process according to the second embodiment. Note that the system configuration and functional configuration of the information processing system according to the present embodiment may be similar to those of the first embodiment. Also, the processes of steps S801-S809 and steps S811-S814 of FIG. 13 may be substantially identical to the corresponding steps of FIG. 8 described above in connection with the first embodiment, and as such, descriptions thereof may be omitted. The descriptions below mainly relate to features of the present embodiment that differ from the first embodiment.

In step S809 of FIG. 13, the relocation information generating unit 503 of the server apparatus 101 generates the terminal apparatus number information 706.

Next, in step S1301, the relocation information generating unit 503 according to the present embodiment calculates a difference between the newly generated terminal apparatus number information 706 and the terminal apparatus number information 706 generated one minute earlier, for example. That is, the relocation information generating unit 503 determines a change in the number of the terminal apparatuses 103 (number of users) located at each point within the building 106.

In step S1302, the relocation information generating unit 503 generates evacuation route information to be notified to the terminal apparatuses 103 according to the change in the number of the terminal apparatuses 103 (number of users) located at each point in the building 106.

As can be appreciated, according to an aspect of the present embodiment, evacuation route information to be notified to the terminal apparatuses 103 is generated according to a change in the number of terminal apparatuses 103 located at each point where an output apparatus 102 is installed.

In the following, a specific application example of the second embodiment is described.

Figure 14:
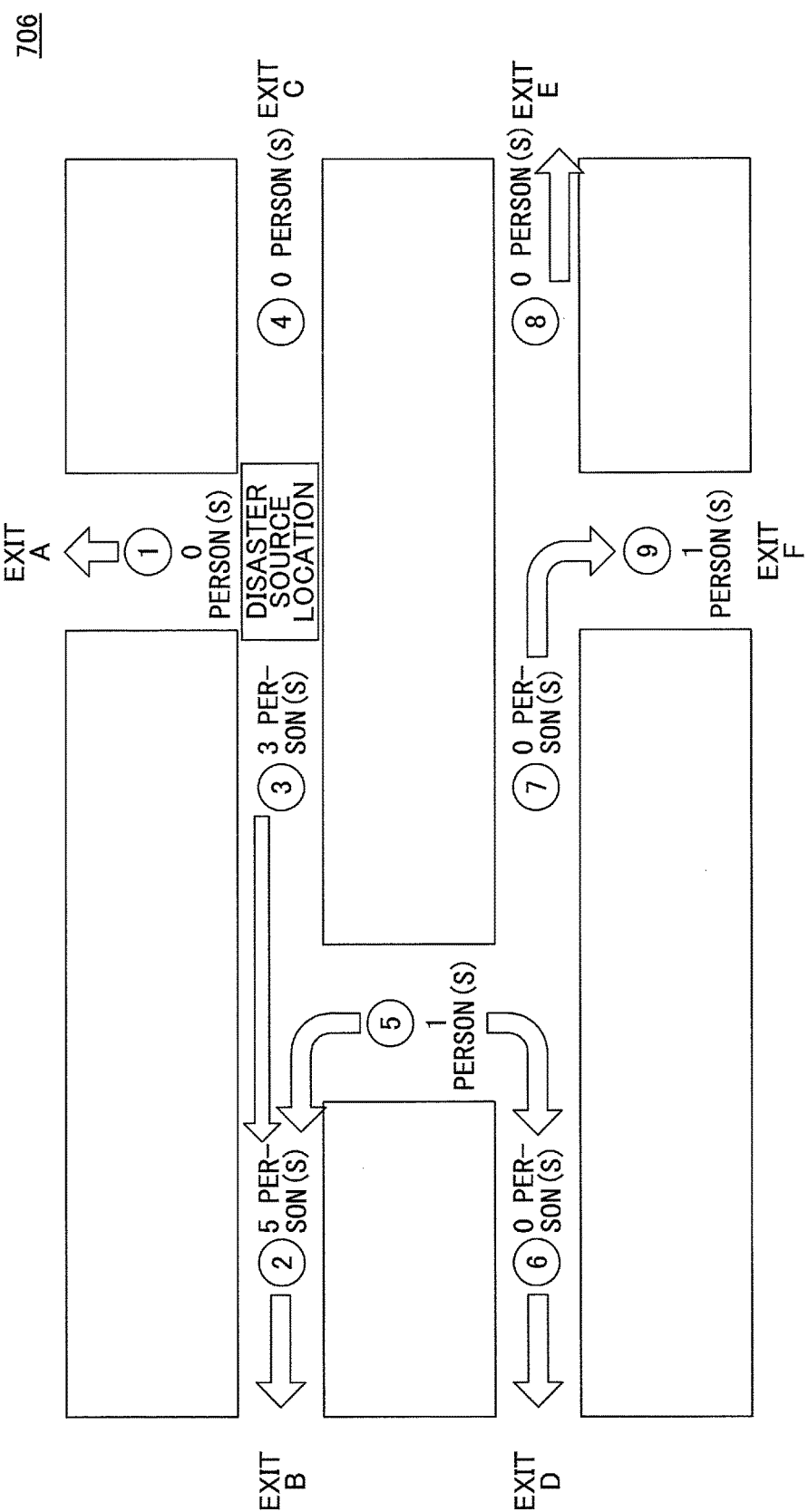
FIG. 14 illustrates an example of generating evacuation route information according to the second embodiment.

FIG. 14 illustrates an example of generating evacuation route information according to the second embodiment.

For example, when a disaster occurs, the relocation information generating unit 503 of the server apparatus 101 may generate the evacuation route information as illustrated in FIG. 10, and each terminal apparatus 103 may be notified of the generated evacuation route information. It is assumed in the following descriptions that one minute later, the terminal apparatus number information 706 has changed from the numbers indicated in FIG. 10 to those indicated in FIG. 14.

Upon comparing FIG. 10 and FIG. 14, it can be determined that the one user that was located at point 1 in FIG. 10, the one user that was located at point 6 in FIG. 10, and the one user that was located at point 8 of FIG. 10 have completed their evacuation from the building 106. Also, it can be assumed that the one user that was located at point 5 in FIG. 10 has not moved.

In this case, for example, it can be conjectured that there is some obstacle in the route for evacuating from point 5 to the emergency exit such that the user is unable to evacuate according to the evacuation route information. On the other hand, with regard to point 2, it may be assumed that two users have evacuated to exit B in the course of 1 minute. Accordingly, it may be assumed that even if the four users located at point 3 and point 5 are guided toward exit B along with the five users located at point 2 in FIG. 14, the nine users located at points 2, 3, and 5 may still be able to evacuate from exit B, in about 5 minutes, for example.

In this case, the relocation information generating unit 503 of the server apparatus 101 may generate evacuation route information to be notified to the terminal apparatuses 103 located at points 3 and 5 for guiding these terminal apparatuses 103 to move toward exit B via point 2.

In the following, another example of generating evacuation route information is described.

Figure 15:
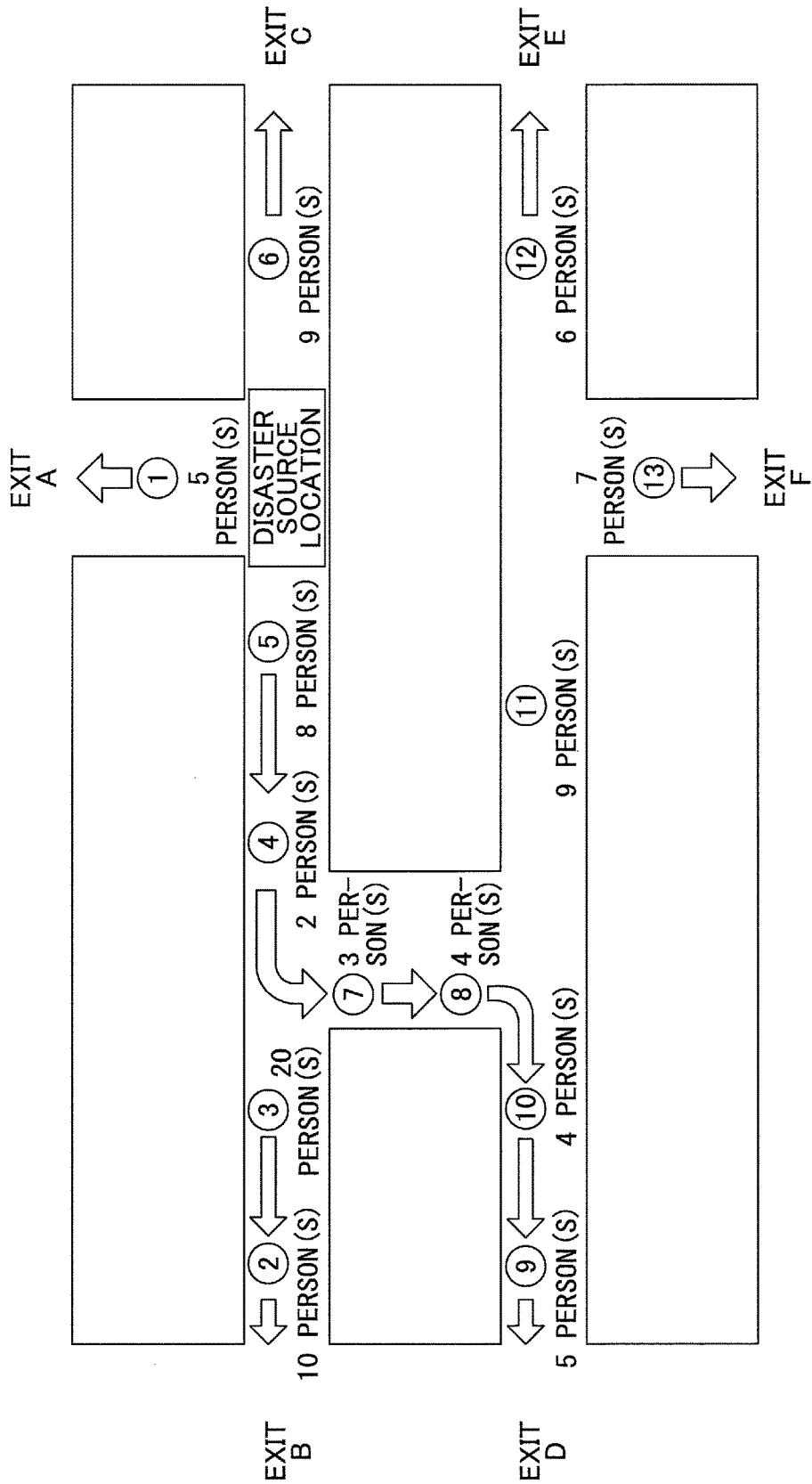
FIG. 15 illustrates another example of generating evacuation route information according to the second embodiment.
Figure 16:
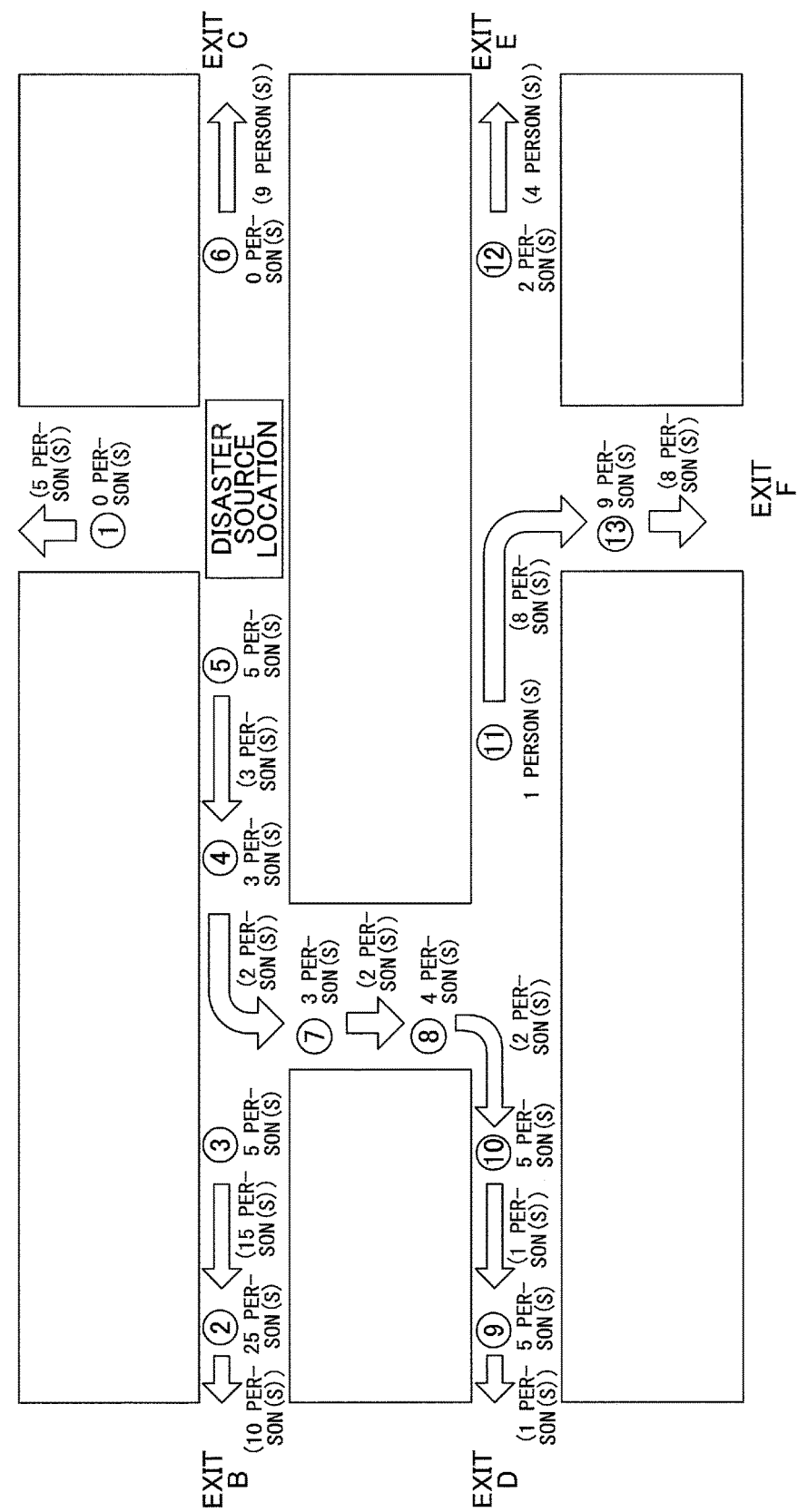
FIG. 16 illustrates another example of generating evacuation route information according to the second embodiment.
Figure 17:
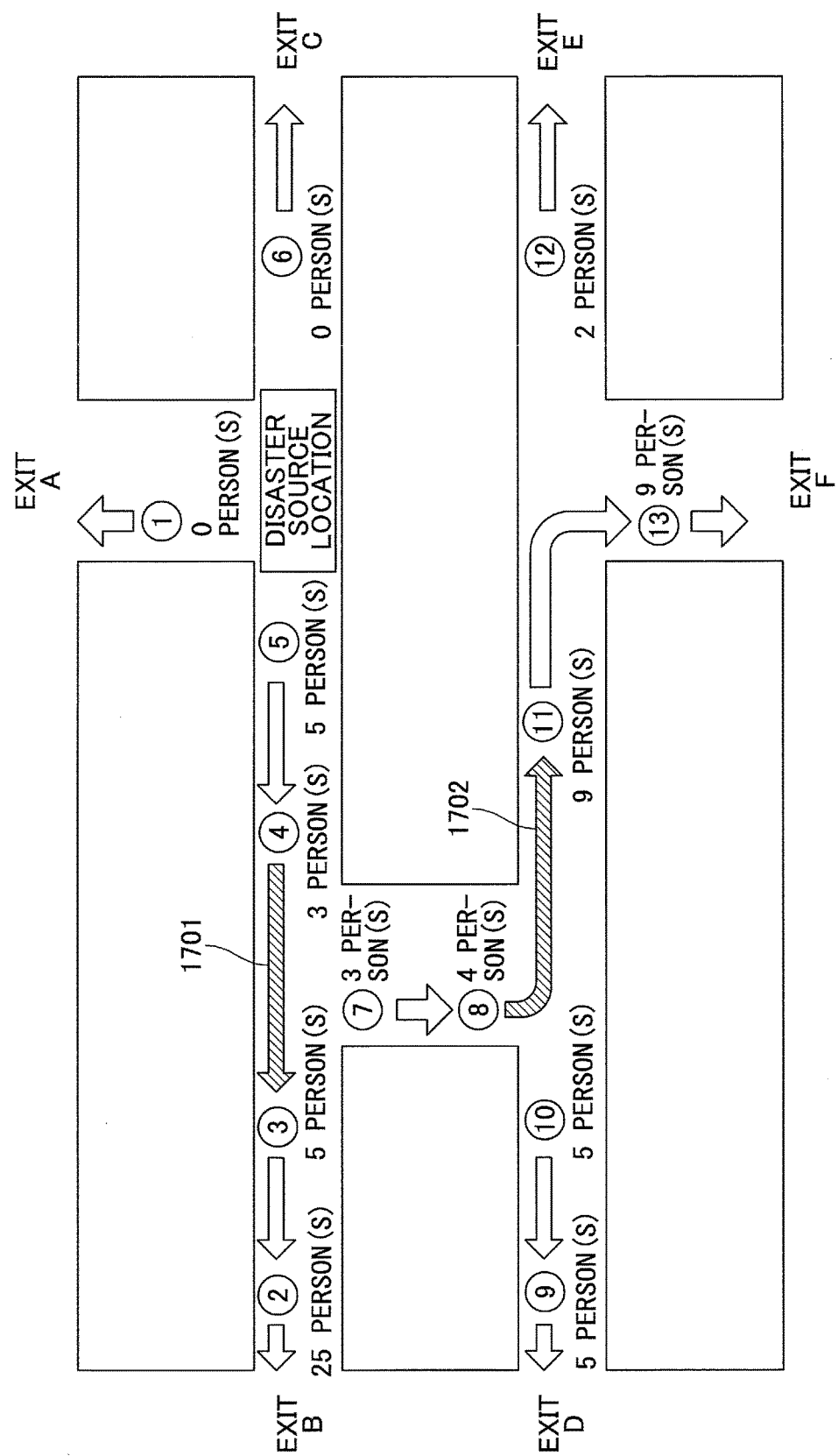
FIG. 17 illustrates another example of generating evacuation route information according to the second embodiment.

FIGS. 15 to 17 illustrate another example of generating evacuation route information according to the second embodiment.

In the present example it is assumed that at a first point in time, the relocation information generating unit 503 of the server apparatus 101 generates evacuation route information as illustrated in FIG. 15. Note that a number indicated next to each circled number corresponding to a location point represents the number of users (number of terminal apparatuses 103) located at the location point. Also, the arrows in FIG. 15 indicate evacuating directions of evacuation routes included in the evacuation route information generated by the relocation information generating unit 503.

Also, it is assumed that in the present example, after a predetermined time period (e.g., one minute) has elapsed from the first point in time, the number of terminal apparatuses 103 (number of users) at each point changes to that as illustrated in FIG. 16. Note that in FIG. 16, the numbers indicated inside parentheses represent the number of terminal apparatuses 103 (number of users) that are moving in the directions of the corresponding arrows.

In the present example, 10 persons are moving from point 2 to exit B, and 15 persons are moving in the direction from point 3 toward point 2 in FIG. 16. Thus, in the example of FIG. 16, it may be assumed that about 10 persons can be evacuated in one minute using the evacuation route from point 3 to exit B via point 2, for example.

On the other hand, one person is moving from point 9 to exit D, and one person is moving from point 10 toward point 9 in FIG. 16. Thus, it may be assumed that about one person can be evacuated in one minute using the evacuation route from point 10 to exit D via point 9, for example.

Similarly, 8 persons are moving from point 13 to exit F, and 8 persons are moving from point 11 toward point 13 in FIG. 16. Thus, it may be assumed that about 8 persons can be evacuated in one minute using the evacuation route from point 11 to exit F via point 13, for example.

Note that although a relatively small number of persons are evacuating using the evacuation route toward exit D, the number of persons that can be evacuated per minute via this evacuation route is a small number. Thus, for example, the evacuation time may be reduced by guiding more persons toward exit B or exit F as illustrated in FIG. 17. In the example illustrated in FIG. 17, an evacuating direction 1701 of the evacuation route information to be notified to the terminal apparatuses 103 located at point 4 is changed to a direction toward point 3 from a direction toward point 7, and an evacuation direction 1702 of the evacuation route information to be notified to the terminal apparatuses 103 located at point 8 is changed to a direction toward point 11 from a direction toward point 10.

Thus, according to an aspect of the present embodiment, the relocation information generating unit 503 of the server apparatus 101 is preferably configured to calculate the number of persons transferable via each evacuation route based on a change in the number of users (number of terminal apparatuses 103) located at each point and generate evacuation route information based on the calculated number of persons transferable via each evacuation route. In this way, persons may be evacuated in a shorter period of time, for example.

Third Embodiment

As a third embodiment of the present invention, an exemplary process is described for detecting a user that is falling behind in evacuating or a user that is unable to evacuate, for example.

Figure 18:
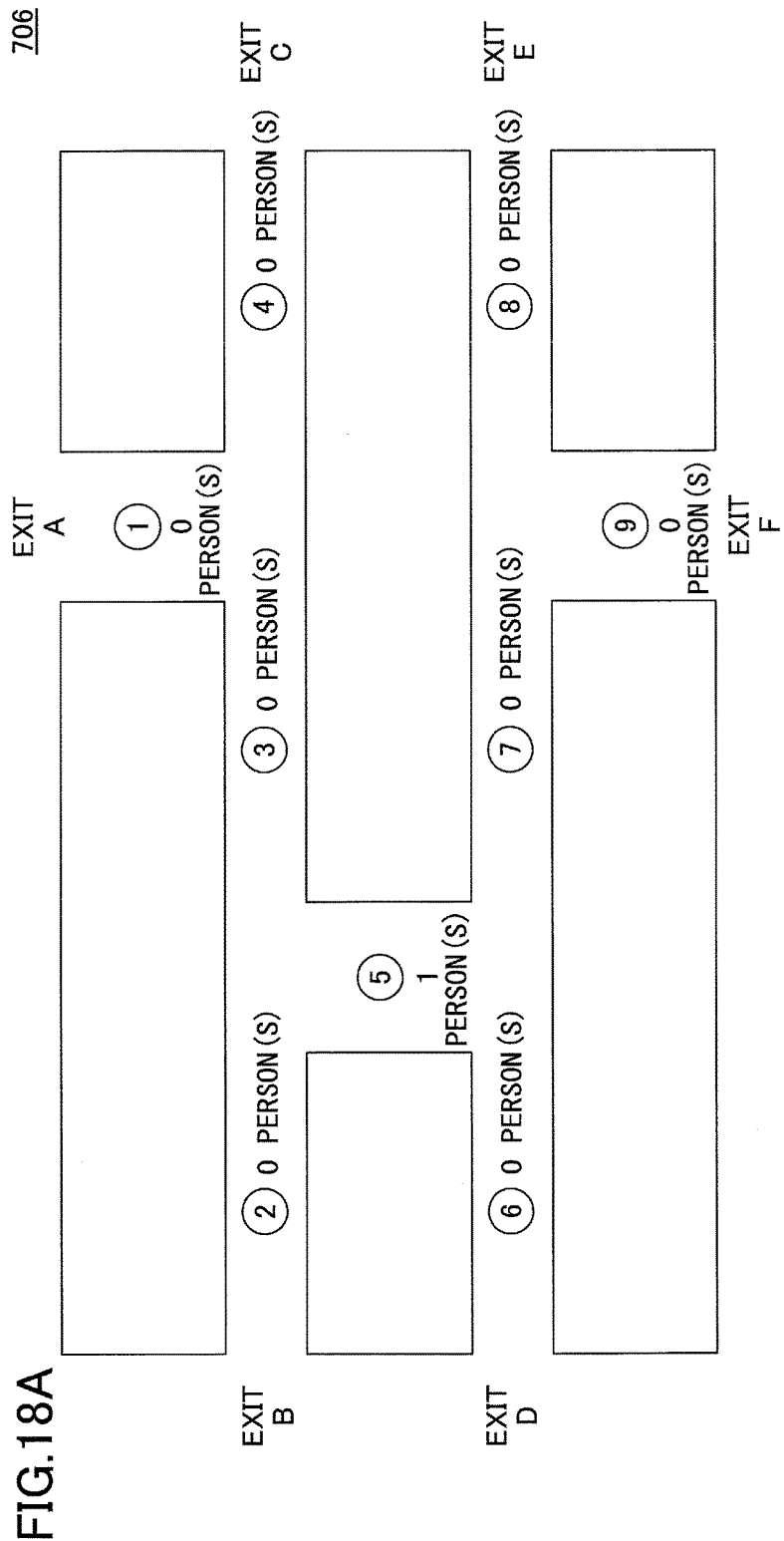
FIGS. 18A and 18B respectively illustrate an example of terminal apparatus number information and an example of terminal apparatus position information according to a third embodiment of the present invention.

FIGS. 18A and 18B respectively illustrate an example of terminal apparatus number information and terminal apparatus position information according to the third embodiment. In the following descriptions, it is assumed that FIG. 18A illustrates an example of the terminal apparatus number information 706 that is generated after a predetermined time period (e.g., 5 minutes) has elapsed from the time the terminal apparatus number information 706 as illustrated in FIG. 14 was generated. Based on the terminal apparatus number information 706 of FIG. 18A, it may be determined that all users other than one user located at point 5 have finished evacuating, whereas the one user (or one terminal apparatus 103) at point 5 has not moved.

In this case, there is a possibility that the user at point 5 has collapsed or is unable to move, for example. Thus, it is desirable for the information processing system 100 or the administrator of the information processing system 100 to notify a predetermined point of contact such as a rescue team, for example, that a user may be left behind at the point 5. Alternatively, the information processing system 100 or the administrator of the information processing system 100 may contact the user of the terminal apparatus 103 located at point 5 via telephone, email or the like to confirm the safety of the user.

Figure 19:
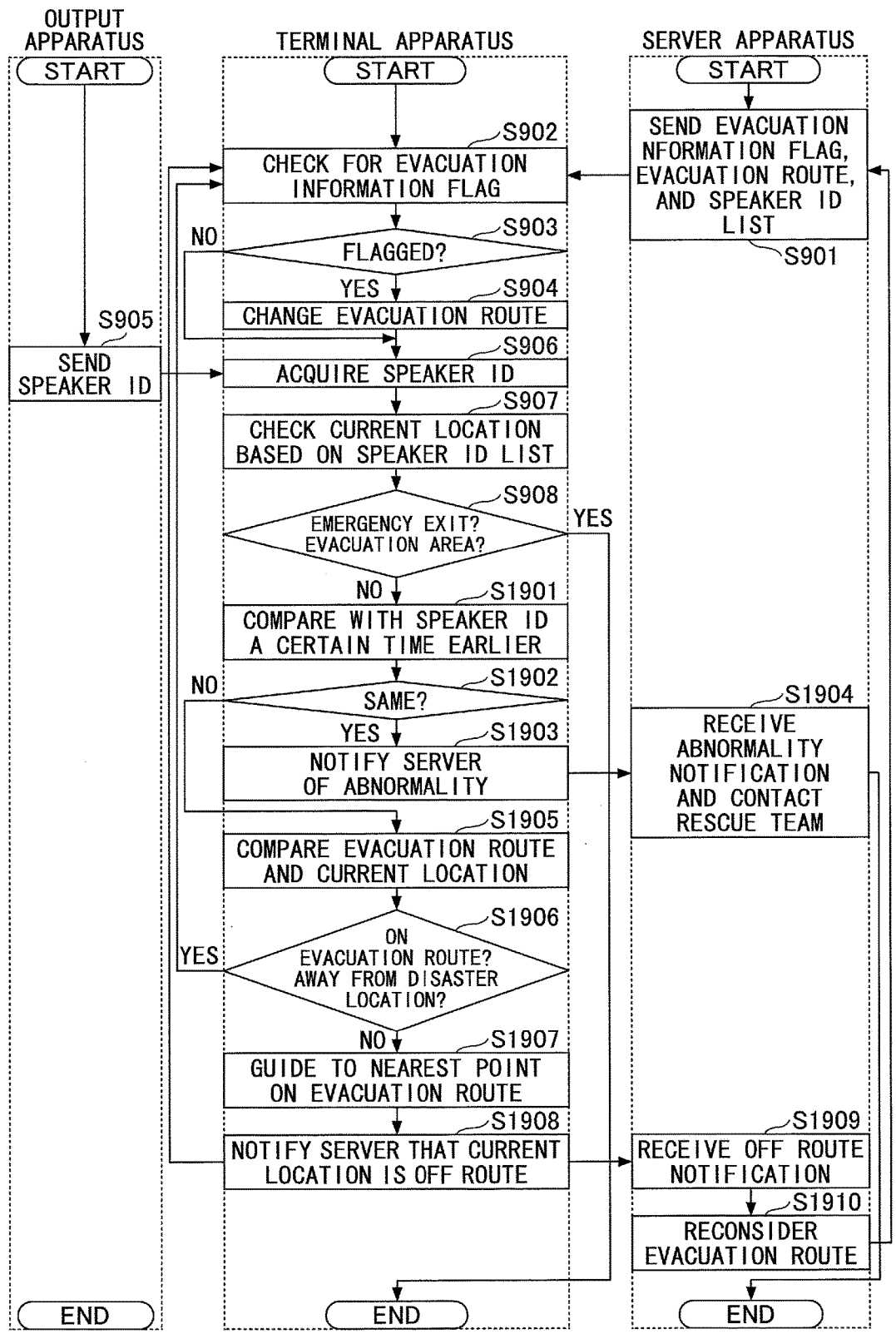
FIG. 19 is a flowchart illustrating an exemplary abnormality detection process implemented by the terminal apparatus according to the third embodiment.

FIG. 19 is a flowchart illustrating an exemplary process including an abnormality detection process implemented by the terminal apparatus 103 according to the third embodiment. Note that the system configuration and functional configuration of the present embodiment may be substantially identical to those of the first embodiment. Also, the processes of steps S901-S908 of FIG. 19 may be substantially identical to the corresponding steps of FIG. 9 described above in connection with the first embodiment. The following descriptions mainly relate to features of the third embodiment that differ from the first embodiment.

In step S908 of FIG. 19, the terminal apparatus 103 determines whether its current location corresponds to a predetermined destination indicated by the evacuation route information. If the terminal apparatus 103 determines that its current location does not correspond to the predetermined destination, the process proceeds to step S1901 and subsequent process steps.

In step S1901, the terminal apparatus 103 acquires the speaker ID included in the sound wave output by the output apparatus 102 and compares the acquired speaker ID with a speaker ID that was acquired a predetermined time earlier (e.g., 1 minute ago).

In step S1902, the terminal apparatus 103 determines whether the speaker IDs compared in step S1901 are the same. When the speaker IDs compared in step S1901 are the same, the terminal apparatus 103 proceeds to step 1903 and notifies (transmits) information to the server apparatus 101 indicating that an abnormality has occurred with respect to the user of the terminal apparatus 103. Upon receiving information that an abnormality has occurred from the terminal apparatus 103, the server apparatus 101 or the administrator of the information processing system 100 notifies a rescue team or the like that an abnormality has occurred with respect to the user (step S1904).

Note that the processes of steps S1902 and S1903 are merely illustrative examples. In other examples, the terminal apparatus 103 may be configured to repeatedly acquire the speaker ID output by the output apparatus at 1 minute intervals, for example, and in a case where the same speaker ID is acquired more than a predetermined number of times (e.g., three times), the terminal apparatus 103 may send a notification that an abnormality has occurred with respect to the user of the terminal apparatus 103.

On the other hand, when it is determined in step S1902 that the speaker IDs compared in step S1901 are different, the terminal apparatus 103 proceeds to step S1905 and the subsequent process steps.

Note that the processes of steps S1905-S1910 are described below in connection with a fourth embodiment of the present invention, and as such, descriptions thereof are omitted.

By implementing the above abnormality detection process, a request for help may be automatically made even in a case where the user of the terminal apparatus 103 is unable to call for help or does not know where to call for help, for example.

Figure 20:
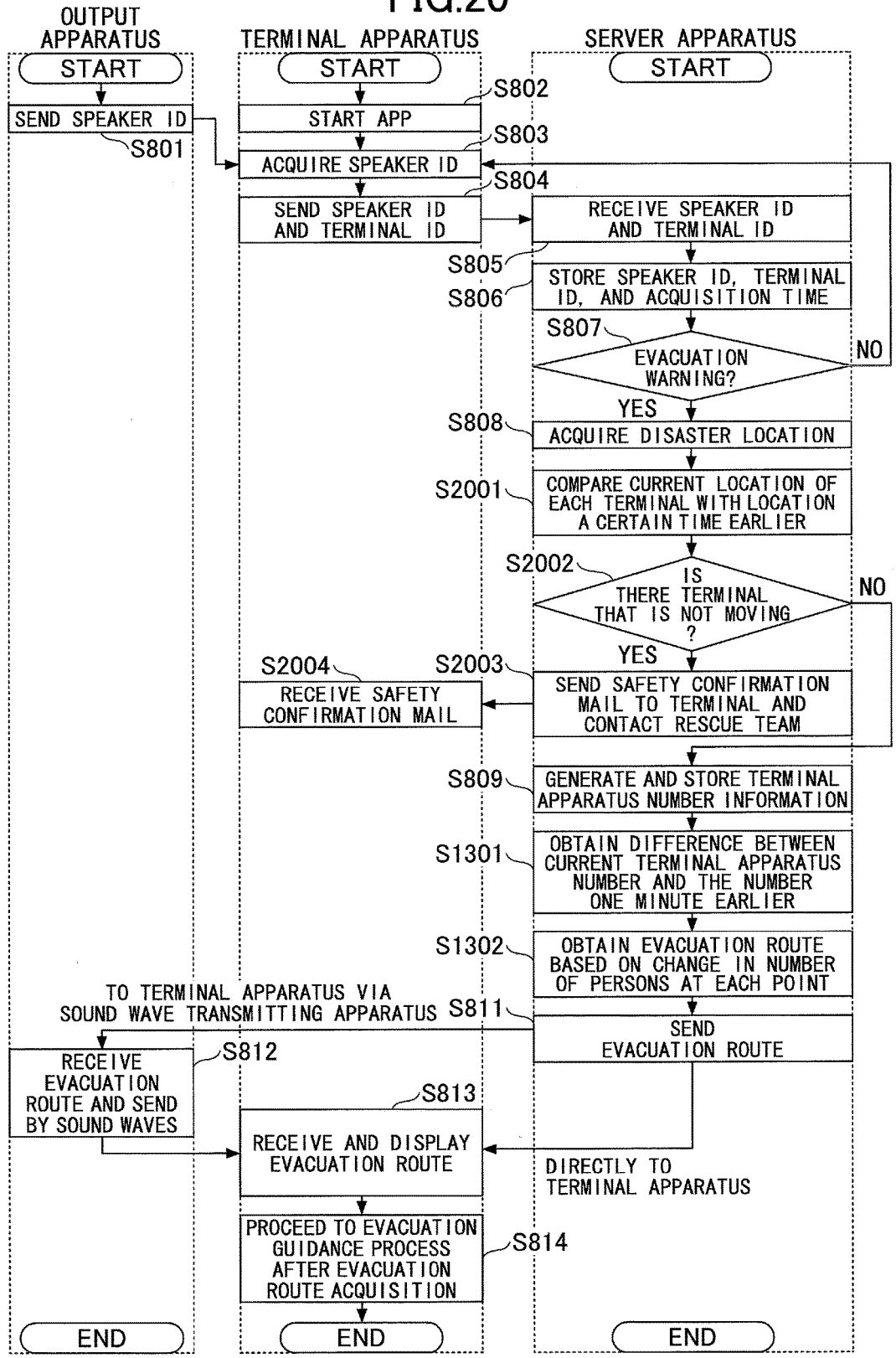
FIG. 20 is a flowchart illustrating an exemplary abnormality detection process implemented by the server apparatus according to the third embodiment.

FIG. 20 is a flowchart illustrating an exemplary process including an abnormality detection process implemented by the server apparatus 101 according to the third embodiment. Note that the processes of steps S801-S808 and step S811 and subsequent process steps of FIG. 20 may be substantially identical to the corresponding steps of FIG. 8 described above in connection with the first embodiment, and the processes of steps S1301 and S1302 of FIG. 20 may be substantially identical to the corresponding steps of FIG. 13 described above in connection with the second embodiment. The following descriptions relate mainly to features of the present embodiment that differ from the first and second embodiments.

In step S2001 of FIG. 20, the server apparatus 101 compares the location of each terminal apparatus 103 at predetermined time intervals to determine whether there is a terminal apparatus 103 that is not moving (step S2002).

In the present embodiment, the predetermined time interval at which the positions of the terminal apparatuses 103 are compared is not particularly limited. For example, the walking speed of a person is about 80 m/min, and assuming speakers (output apparatuses 102) are arranged 10 m apart from each other, the terminal apparatus 103 would presumably be able to acquire eight different speaker IDs from eight different location points in one minute. Accordingly, for example, the server apparatus 101 may be configured to compare the positions of each terminal apparatus 103 every 30 seconds, and if the positions of a terminal apparatus 103 is the same over at least two comparisons, it may be determined that the terminal apparatus 103 has not moved.

When the server apparatus 101 determines in step S2002 that there is a terminal apparatus 103 that is not moving, the server apparatus 101 may transmit a safety confirmation e-mail to the terminal apparatus 103 that is identified as not moving and contact a predetermined point of contact such as an evacuation rescue team (step S2003). In step S2004, the terminal apparatus 103 receives the safety confirmation e-mail from the server apparatus 101.

On the other hand, when the server apparatus 101 determines in step S2002 that there is no terminal apparatus 103 that is not moving, the process proceeds to step S809, and the server apparatus 101 performs step S809 and subsequent process steps of the second embodiment.

According to an aspect of the present embodiment, a user that is unable to evacuate for some reason may be detected and appropriate measures such as confirming the safety of the user and dispatching a rescue team may be easily implemented, for example.

Fourth Embodiment

As the fourth embodiment of the present invention, a process is described for detecting a user of a terminal apparatus 103 that has taken a wrong turn in an evacuation route and is approaching the disaster source location, for example.

Figure 21:
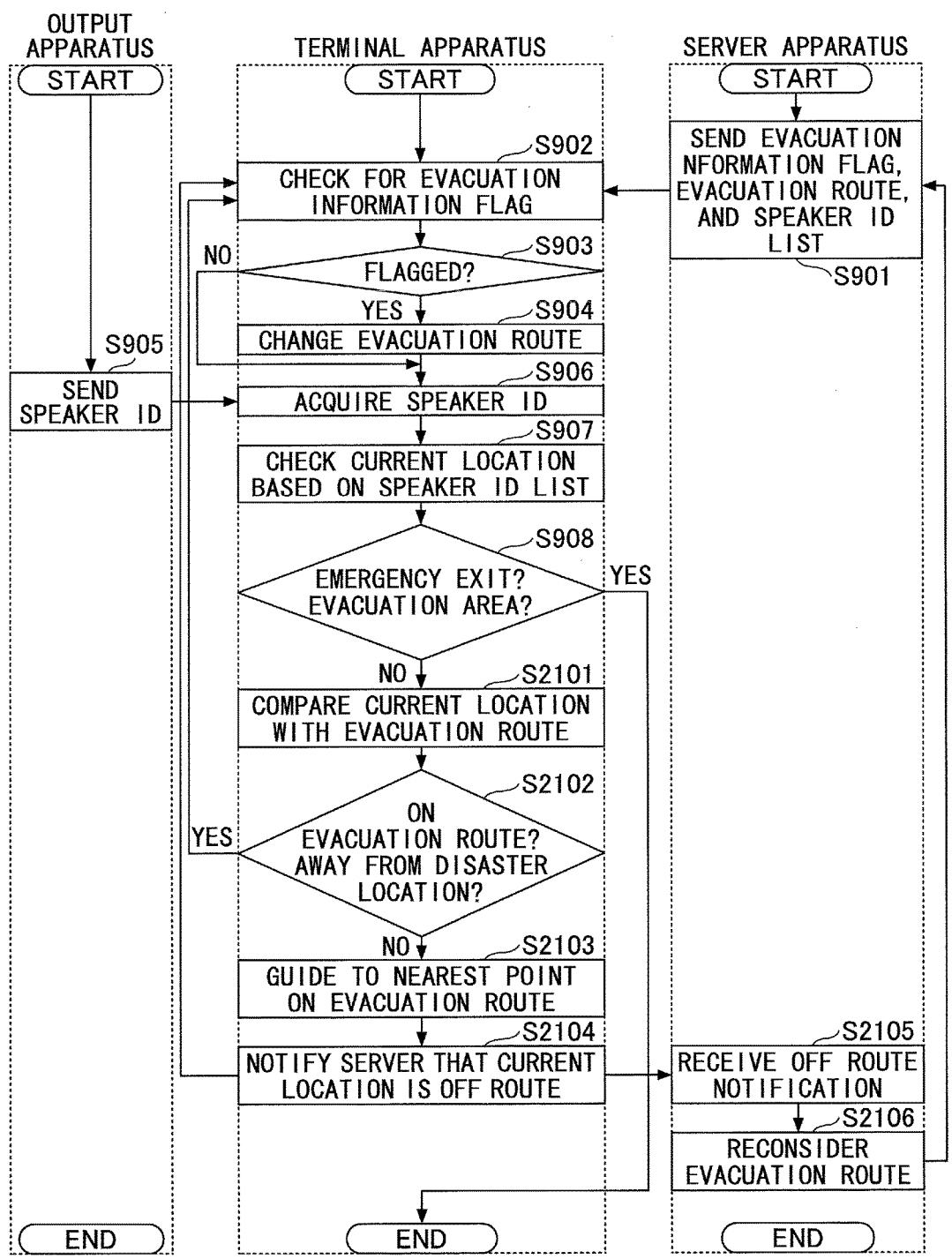
FIG. 21 is a flowchart illustrating an exemplary process to be implemented when the terminal apparatus is off an evacuation route according to a fourth embodiment of the present invention.

FIG. 21 is a flowchart illustrating an exemplary process for detecting a case where a terminal apparatus 103 has gone off an evacuation route according to the fourth embodiment. Note that the system configuration and functional configuration of the present embodiment may be substantially identical to those of the first embodiment. Also, the processes of steps S901-S908 of FIG. 21 may be substantially identical to the corresponding steps of FIG. 9 described above in connection with the first embodiment. The following descriptions mainly relate to features of the present embodiment that differ from the first embodiment.

In step S2101 of FIG. 21, the terminal apparatus 103 compares its evacuation route and its current location, and determines whether it is currently on the evacuation route and is away from the disaster source location (step S2102). If the current location of the terminal 103 is on the evacuation route and is away from the disaster source location, that is, if the terminal apparatus 103 is proceeding in the right direction according to the evacuation route information, the process returns to step S902 and repeats the same process steps descried above. On the other hand, if the current location of the terminal apparatus 103 is not on the evacuation route or is not far from the disaster source location, that is, if the terminal apparatus 103 is not evacuating in the right direction according to the evacuation route information, the process proceeds to step S2103 and the subsequent process steps.

In step S2103, the terminal apparatus 103 prompts the display/input unit 522 to display evacuation route information for guiding the user to a point where the nearest output apparatus 102 is installed on the escape route, and the terminal apparatus 103 notifies the server apparatus 101 that it has gone off the evacuation route (step S2104).

In step S2105, the server apparatus 101 receives information from the terminal unit 103 indicating that the terminal apparatus 103 has gone off the evacuation route, and the server apparatus 101 reconsiders and updates the evacuation route information to be notified to the terminal apparatus 103 (step S2106). Then, the process returns to step S901 and the above process steps are repeated thereafter.

In the following, a specific example of a case where the terminal apparatus 103 goes off the evacuation route is described.

FIGS. 22A and 22B illustrate an example of position information of the terminal apparatuses 103 at the time a disaster occurs according to the fourth embodiment. FIG. 22A illustrates the terminal apparatus number information 706 and evacuation routes (arrows) generated by the server apparatus 101 at the time the disaster has occurred. FIG. 22B is a table indicating the terminal IDs of the terminal apparatuses 103 that are located in areas corresponding to points 4 and 5 and guidance points to which these terminal apparatuses 103 are to be guided.

Figure 23A:
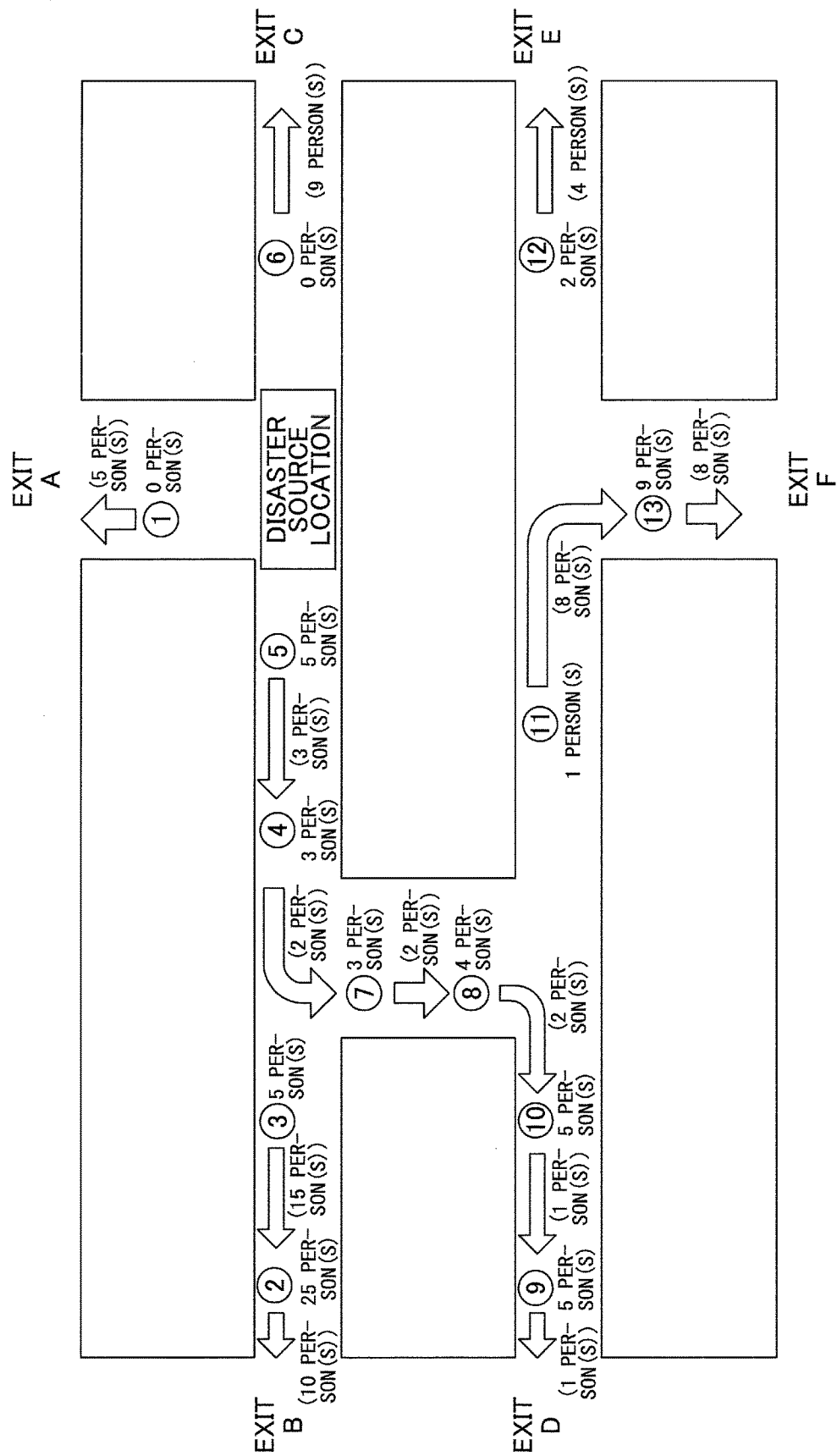

FIGS. 23A and 23B illustrate position information of the terminal apparatuses 103 after a predetermined time period has elapsed from the time the disaster has occurred according to the fourth embodiment. FIG. 23A illustrates the relocation of the terminal apparatuses 103 after a predetermined time has elapsed from the time the disaster has occurred. FIG. 23B is a table indicating the terminal IDs of the terminal apparatuses 103 located at points 4 and 5 after the predetermined time period has elapsed.

Comparing FIGS. 22A and 22B with FIGS. 23A and 23B, it can be appreciated that the terminal apparatus 103 with the terminal ID "XXX-XXXX-0105" was located at point 4 when the disaster occurred, but after the predetermined time period has elapsed, instead of moving to its guidance point 7, this terminal apparatus 103 has moved in an opposite direction to point 5. In other words, the user of the terminal apparatus 103 with the terminal ID "XXX-XXXX-0105" has moved in a direction toward the disaster source location. In such a case, the server apparatus 101 preferably warns the terminal apparatus 103 with the terminal ID "XXX-XXXX-0105" by an alarm, for example, generates new evacuation route information for the terminal apparatus 103, and notifies the terminal apparatus 103 of the new evacuation route information.

FIG. 24 is a table illustrating an example of determination information according to the fourth embodiment.

For example, referring to FIGS. 22A-23B, the terminal apparatus 103 with the terminal ID "XXX-XXXX-0105" has moved from point 4 to point 5, and its current position is different from the guidance point 7 designated for this terminal apparatus 103. As such, "x" is indicated under the item "different point" in FIG. 24. Note that "x" for the item "different point" indicates that the location (current position) of the corresponding terminal apparatus 103 as indicated in FIG. 23B does not correspond to the guidance point for the corresponding terminal apparatus 103 as indicated in FIG. 22B.

Further, as described above, the terminal apparatus 103 with the terminal ID "XXX-XXXX-0105" is approaching the disaster source location, and as such, "x" is indicated under the item "away from disaster location". Note that "x" for the item "away from disaster location" indicates that the location (current position) of the corresponding terminal apparatus 103 as indicated in FIG. 23B is closer to the disaster source location as compared with the guidance point for the corresponding terminal apparatus 103 as indicated in FIG. 23B.

In this case, the server apparatus 101 issues a determination of "x" for the terminal apparatus 103 with the terminal ID "XXX-XXXX-0105" indicated in FIG. 22, and the server apparatus 101 preferably conveys a warning such as an alarm notification to the terminal apparatus 103 with the terminal ID "XXX-XXXX-0105".

Note that in some cases, depending on the passageway of the building 106 in relation to the disaster source location, for example, the terminal apparatus 103 may temporarily approach the disaster source location even if it is proceeding in the right direction according to the evacuation route information. Thus, the server apparatus 101 preferably determines whether to issue an alarm notification to the terminal apparatus 103 based on both the determination item "different point" and the determination item "away from disaster location".

Also, it can be appreciated from FIGS. 22A-23B that the terminal apparatus 103 with the terminal ID "XXX-XXXX-0101" has not moved from point 4, and its current position differs from the guidance point 7 designated for this terminal apparatus 103. As such, "x" is indicated under the item "different point" for this terminal apparatus 103. However, the terminal apparatus 103 with the terminal ID "XXX-XXXX-0101" is not moving closer to the disaster source location, and as such, "o" is indicated under the item "away from disaster location". In this case, the server apparatus 101 issues a determination of "o" for this terminal apparatus 103, and the server apparatus 101 does not convey a warning such as an alarm notification or the like to the terminal apparatus 103 with the terminal ID "XXX-XXXX-0101".

As described above, according to an aspect of the present embodiment, the server apparatus 101 may convey an alarm notification and/or new evacuation route information to the terminal apparatus 103, in a case where the terminal apparatus 103 is not located at a position designated by the evacuation route information or a position on the evacuation route after a predetermined time period has elapsed from the time a disaster has occurred, for example.

In the information processing system according to the present embodiment, a terminal apparatus 103 that is erroneously moving toward a disaster source location may be detected, and appropriate evacuation route information may be conveyed to the user of the terminal apparatus 103, for example.

Other Embodiments

The first through fourth embodiments described above are merely illustrative examples and are not intended to limit the scope of the present invention. That is, an information processing system according to the present invention may have other various system configurations and features.

For example, in the first through fourth embodiments, the terminal apparatus 103 is connected to the network 105 through wireless communication or the like, and the terminal apparatus 103 transmits the terminal ID of the terminal apparatus 103 and the speaker ID of the output apparatus 102 to the server apparatus 101. However, when a disaster occurs, wireless communication access may be concentrated, and the terminal apparatus 103 may encounter difficulties in connecting to the network 105, for example.

Figure 25:
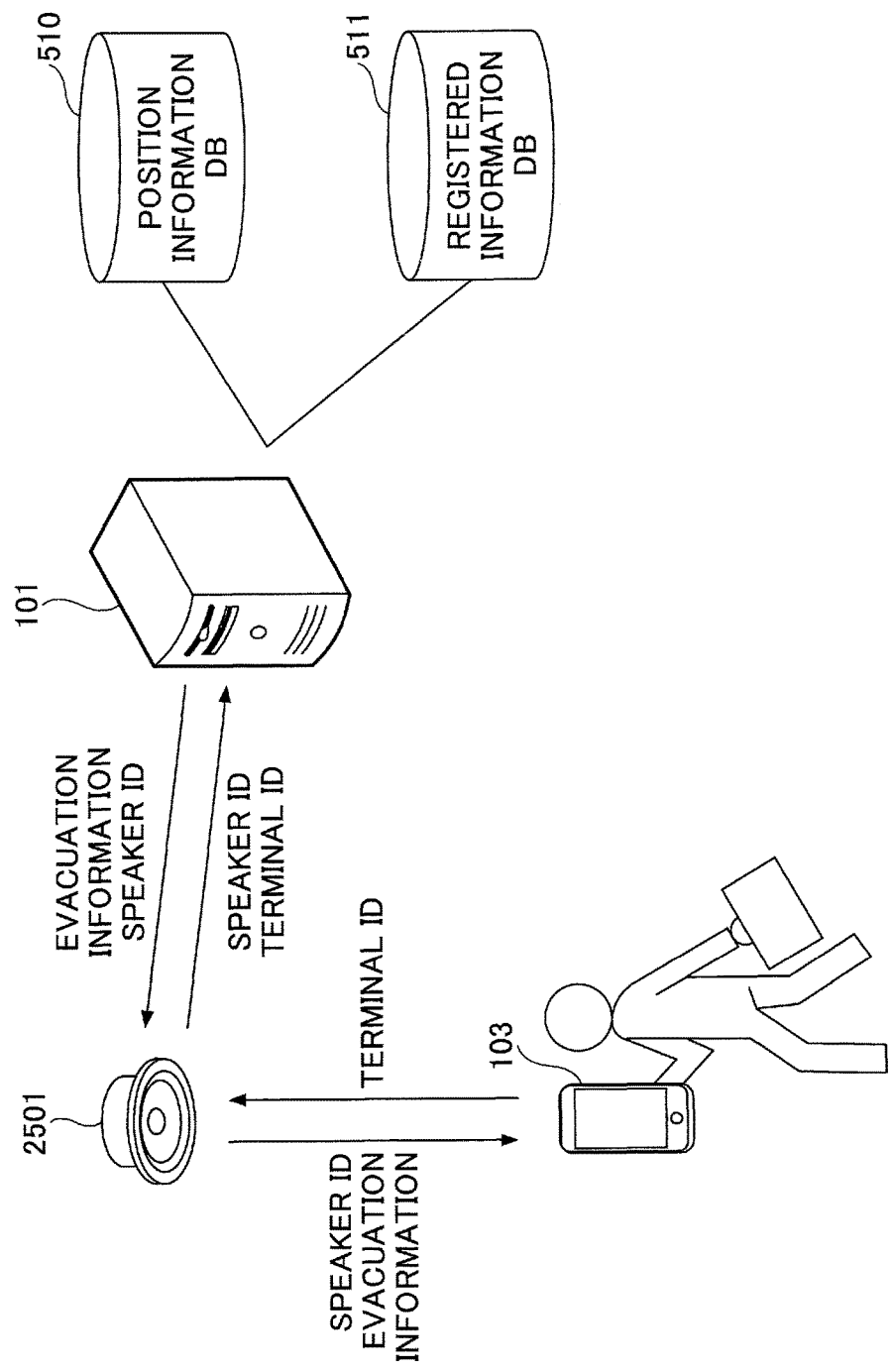
FIG. 25 illustrates another exemplary configuration of the information processing system.

Accordingly, as another preferred embodiment, the information processing system 100 may have a system configuration as illustrated in FIG. 25, for example. In FIG. 25, the information processing system 100 includes an input/output apparatus 2501 that is capable of acquiring a sound wave output by the terminal apparatus 103 in addition to outputting a sound wave including a speaker ID. The input/output apparatus 2501 is configured to acquire a terminal ID included in the sound wave output by the terminal apparatus 103.

In this case, the terminal apparatus 103 outputs a sound wave including the terminal ID of the terminal apparatus 103. The input/output apparatus 2501 (another example of output apparatus) acquires the terminal ID included in the sound wave output by the terminal apparatus 103 and sends the acquired terminal ID and the speaker ID of the input/output apparatus 2501 to the server apparatus 101. Based on the information received from the input/output apparatus 2501, the server apparatus 101 may generate terminal apparatus position information as illustrated in FIG. 7A in a manner similar to the first through fourth embodiments described above, for example. Also, the server apparatus 101 may generate and transmit (notify) evacuation route information to the terminal apparatus 103 via the input/output apparatus 2501, for example.

Figure 26:
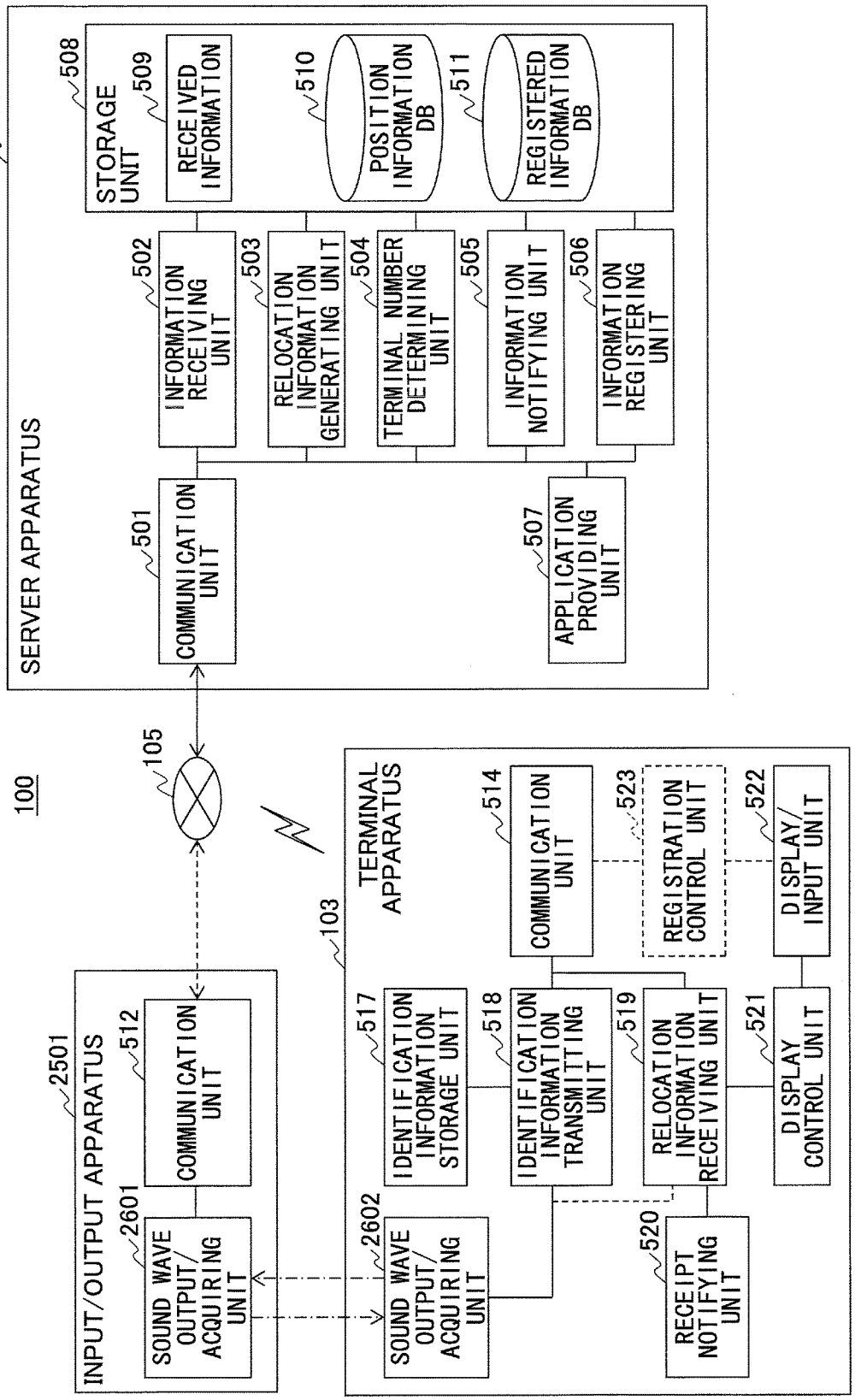
FIG. 26 illustrates another exemplary functional configuration of the information processing system.

FIG. 26 is a block diagram illustrating an exemplary functional configuration of the information processing system according to the present embodiment.

In FIG. 26, the input/output apparatus 2501 includes a sound wave output/acquiring unit 2601 instead of the sound wave output unit 513 of FIG. 5.

The sound wave output/acquiring unit 2601 outputs a sound wave including the speaker ID of the input/output apparatus 2501 and acquires the terminal ID of the terminal apparatus 103 included in the sound wave output by the terminal apparatus 103. The sound wave output/acquiring unit 2601 may be implemented by the sound wave control unit 306, the sound wave output unit 307, the sound wave acquiring unit 308, and the CPU 301 of FIG. 3 executing a relevant program, for example.

Also, in FIG. 26, the terminal apparatus 103 includes a sound wave output/acquiring unit 2602 instead of the sound wave acquiring unit 515 and the information extracting unit 516 of FIG. 5, for example. The sound wave output/acquiring unit 2602 of the terminal apparatus 103 outputs a sound wave including the terminal ID of the terminal apparatus 103. The sound wave output/acquiring unit 2602 is also configured to acquire evacuation route information that is included in a sound wave output by the input/output apparatus 2501. The sound wave output/acquiring unit 2602 of the terminal apparatus 103 may be implemented by the microphone unit 407, the speaker unit 408, and the CPU 401 of FIG. 4 executing a relevant program, for example.

With the above configuration, the information processing system 100 may avoid concentration of wireless communication and provide evacuation route information in a reliable manner, for example.

Also, in the first through fourth embodiments described above, the server apparatus 101 includes the registered information DB 511 and the position information DB 510. However, in other embodiments, information such as the registered information DB 511 and the position information DB 510 may be stored and managed by another server apparatus, for example.

SUMMARY

According to an embodiment of the present invention, an information processing system (100) includes a plurality of output apparatuses (102) that are arranged at different positions and are configured to output a sound wave including output apparatus identification information of the output apparatus (102). In addition, a terminal apparatus (103) carried by a user acquires the output apparatus identification information included in the sound wave output by the output apparatus (102), and transmits the acquired output apparatus identification information and terminal apparatus identification information of the terminal apparatus (103) to a server apparatus (101). Further, when a disaster such as a fire occurs, for example, the server apparatus (101) notifies the terminal apparatus (103) of appropriate evacuation route information in accordance with the position of the terminal apparatus (103) based on the output apparatus identification information and the terminal apparatus identification information received from the terminal apparatus (103).

Thus, in the information processing system (100) according to the present embodiment, when a disaster occurs inside a building or the like, an appropriate evacuation route according to the position of each user may be easily presented to users that are inside the building, for example.

Note that reference numerals within the above parentheses are provided for ease of understanding only and are not intended to limit the scope of the present invention.

The present invention can be implemented in any convenient form, for example, using dedicated hardware, or a mixture of dedicated hardware and software. The present invention may be implemented as computer software implemented by one or more networked processing apparatuses. The network can comprise any conventional terrestrial or wireless communications network, such as the Internet. The processing apparatuses can comprise any suitably programmed apparatuses such as a general purpose computer, personal digital assistant, mobile telephone (such as a WAP or 3G-compliant phone) and so on. Since the present invention can be implemented as software, each and every aspect of the present invention thus encompasses computer software implementable on a programmable device. The computer software can be provided to the programmable device using any non-transitory storage medium for storing processor readable code such as a floppy disk, a hard disk, a CD ROM, a magnetic tape device or a solid state memory device. The non-transitory storage medium can comprise any computer-readable medium except for a transitory, propagating signal.

The hardware platform includes any desired hardware resources including, for example, a central processing unit (CPU), a random access memory (RAM), and a hard disk drive (HDD). The CPU may include processors of any desired type and number. The RAM may include any desired volatile or nonvolatile memory. The HDD may include any desired nonvolatile memory capable of recording a large amount of data. The hardware resources may further include an input device, an output apparatus, and a network device in accordance with the type of the apparatus. The HDD may be provided external to the apparatus as long as the HDD is accessible from the apparatus. In this case, the CPU, for example, the cache memory of the CPU, and the RAM may operate as a physical memory or a primary memory of the apparatus, while the HDD may operate as a secondary memory of the apparatus.

The present application is based on and claims the benefit of priority of Japanese Patent Application No. 2015-004245 filed on Jan. 13, 2015, the entire contents of which are hereby incorporated by reference.

What is claimed is:

1. An information processing apparatus that is capable of communicating with a terminal apparatus, the information processing apparatus comprising:
   a memory; and
   a processor, in communication with a memory, that implements processes of:
      receiving from the terminal apparatus, terminal apparatus identification information of the terminal apparatus and output apparatus identification information of an output apparatus that has been acquired by the terminal apparatus;
      determining a number of the terminal apparatuses corresponding to different positions at which a plurality of the output apparatuses are arranged, the determination being made based on the terminal apparatus identification information and the output apparatus identification information received from a plurality of the terminal apparatuses;
      notifying the terminal apparatus of relocation information based on the received terminal apparatus identification information and the received output apparatus identification information, the relocation information being generated based on a change in the determined number of terminal apparatuses and including at least one of information on moving from a position of the terminal apparatus to a predetermined destination and information on moving from the position of the terminal apparatus to a next location.

2. The information processing apparatus according to claim 1, wherein the terminal apparatus is notified of the relocation information via the output apparatus.

3. The information processing apparatus according to claim 1, wherein the processor further implements a process of:
   generating the relocation information based on the received terminal apparatus identification information and the received output apparatus identification information.

4. The information processing apparatus according to claim 3, wherein the processor further
   generates the relocation information based on event occurrence information including notification of an occurrence of a predetermined event and a location where the predetermined event has occurred, the relocation information including information for avoiding the location where the predetermined event has occurred.

5. The information processing apparatus according to claim 1, wherein
   the position of the terminal apparatus is identified based on the received terminal apparatus identification information and the received output apparatus identification information, and output apparatus position information storing the output apparatus identification information of the output apparatus in association with position information of the output apparatus.

6. The information processing apparatus according to claim 1, wherein the relocation information includes identification information indicating that the relocation information corresponds to evacuation information for moving to the predetermined destination or the next location.

7. The information processing apparatus according to claim 1, wherein
   after notifying the relocation information to the terminal apparatus, the position of the terminal apparatus is acquired at predetermined time intervals, and the acquired positions are compared; and
   when the compared positions of the terminal apparatus are the same, predetermined notification information is conveyed to at least one of the terminal apparatus and a predetermined point of contact.

8. The information processing apparatus according to claim 1, wherein
   when the position of the terminal apparatus acquired after a predetermined time period from a time the terminal apparatus is notified of the relocation information does not correspond to a location or a route indicated by the relocation information, new relocation information is conveyed to the terminal apparatus.

9. An information processing system comprising:
   an information processing apparatus;
   a plurality of output apparatuses that are arranged at different positions; and
   a terminal apparatus that is capable of communicating with the information processing apparatus;
   wherein the information processing apparatus includes
      a first memory; and
      a first processor, in communication with the first memory, that implements processes of:
         receiving from the terminal apparatus, terminal apparatus identification information of the terminal apparatus and output apparatus identification information of an output apparatus of the plurality of output apparatuses that has been acquired by the terminal apparatus;
         determining a number of the terminal apparatuses corresponding to different positions at which a plurality of the output apparatuses are arranged, the determination being made based on the terminal apparatus identification information and the output apparatus identification information received from a plurality of the terminal apparatuses; and
         notifying the terminal apparatus of relocation information based on the received terminal apparatus identification information and the received output apparatus identification information, the relocation information being generated based on a change in the determined number of the terminal apparatuses and including at least one of information on moving from a position of the terminal apparatus to a predetermined destination and info nation on moving from the position of the terminal apparatus to a next location;

wherein the output apparatus of the plurality of output apparatuses includes a sound wave outputting unit configured to output a sound wave including predetermined information; and wherein the terminal apparatus includes
- a second memory; and
- a second processor, in communication with the second memory, that implements processes of:
  - acquiring the sound wave output by the output apparatus;
  - extracting the predetermined information included in the acquired sound wave; and
  - receiving the relocation information from the information processing apparatus or the output apparatus and notifying a user that the relocation information has been received.

10. The information processing system according to claim 9, wherein
the sound wave output by the output apparatus includes the output apparatus identification information of the output apparatus;
the terminal apparatus acquires the sound wave including the output apparatus identification information at predetermined time intervals after receiving the relocation information and compares the output apparatus identification information included in the sound waves acquired at the predetermined time intervals; and
when the compared output apparatus identification information included in the acquired sound waves are the same, the terminal apparatus conveys predetermined notification information to the information processing apparatus.

11. A computer program product comprising a non-transitory computer-readable medium having a computer program recorded thereon that is executable by an information processing apparatus that is capable of communicating with a terminal apparatus, the computer program when executed causing the information processing apparatus to perform an information processing method including the steps of:
- receiving from the terminal apparatus, terminal apparatus identification information of the terminal apparatus and output apparatus identification information of an output apparatus that has been acquired by the terminal apparatus;
- determining a number of the terminal apparatuses corresponding to different positions at which a plurality of the output apparatuses are arranged, the determination being made based on the terminal apparatus identification information and the output apparatus identification information received from a plurality of the terminal apparatuses; and
- notifying the terminal apparatus of relocation information based on the received terminal apparatus identification information and the received output apparatus identification information, the relocation information being generated based on a change in the determined number of the terminal apparatuses and including at least one of information on moving from a position of the terminal apparatus to a predetermined destination and information on moving from the position of the terminal apparatus to a next location.

* * * * *